United States Patent
Ohyama et al.

(10) Patent No.: US 11,363,215 B2
(45) Date of Patent: Jun. 14, 2022

(54) LIGHT OBSERVATION APPARATUS

(71) Applicant: Panasonic Intellectual Property Management Co., Ltd., Osaka (JP)

(72) Inventors: Tatsushi Ohyama, Osaka (JP); Mariko Miyashita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 16/784,933

(22) Filed: Feb. 7, 2020

(65) Prior Publication Data

US 2020/0177822 A1    Jun. 4, 2020

Related U.S. Application Data

(63) Continuation of application No. PCT/JP2018/029500, filed on Aug. 7, 2018.

(30) Foreign Application Priority Data

Aug. 29, 2017 (JP) .............................. JP2017-164411
Jul. 10, 2018 (JP) .............................. JP2018-130623

(51) Int. Cl.
*H04N 5/243* (2006.01)
*G01N 21/64* (2006.01)
(Continued)

(52) U.S. Cl.
CPC ......... *H04N 5/243* (2013.01); *G01N 21/6456* (2013.01); *G06T 7/0012* (2013.01); *H04N 5/2256* (2013.01); *G06T 2207/30004* (2013.01)

(58) Field of Classification Search
CPC .. H04N 5/243; H04N 5/2256; G01N 21/6456; G01N 2021/4709;
(Continued)

(56) References Cited

U.S. PATENT DOCUMENTS 6,597,439 B1  7/2003  Hakamata
7,943,910 B2*  5/2011  Bizzarri ............... G01N 21/645
                                                          250/459.1
(Continued)

FOREIGN PATENT DOCUMENTS

JP    2000-230903    8/2000
JP    2001-066254    3/2001
(Continued)

OTHER PUBLICATIONS

International Search Report of PCT application No. PCT/JP2018/029500 dated Oct. 9, 2018.

*Primary Examiner* — Chiawei Chen
(74) *Attorney, Agent, or Firm* — McDermott Will & Emery LLP

(57) ABSTRACT

A light observation apparatus includes: a first photodetector that, upon irradiation of at least part of a physical object with irradiation light, receives first light containing ambient light and at least one selected from the group consisting of reflected light returning from the at least part and fluorescence produced from the at least part, and that outputs a first output signal representing a reception intensity of the first light; a second photodetector that receives second light containing the ambient light and outputs a second output signal representing a reception intensity of the second light; and a signal processing circuit. The signal processing circuit attenuates a first signal component corresponding to the ambient light from the first output signal based on the first output signal and the second output signal.

20 Claims, 16 Drawing Sheets

(51) Int. Cl.
*G06T 7/00* (2017.01)
*H04N 5/225* (2006.01)

(58) Field of Classification Search
CPC ... G01N 2021/6419; G01N 2021/6421; G01N 21/47; G01N 21/6486; G06T 7/0012; G06T 2207/30004
See application file for complete search history.

(56) References Cited

U.S. PATENT DOCUMENTS

| | | | |
|---|---|---|---|
| 2004/0254478 A1* | 12/2004 | de Josselin de Jong | A61B 5/0088 433/29 |
| 2017/0142314 A1* | 5/2017 | Moore | H04N 5/2351 |
| 2018/0234603 A1* | 8/2018 | Moore | H04N 5/2357 |

FOREIGN PATENT DOCUMENTS

| | | |
|---|---|---|
| JP | 2004-294337 | 10/2004 |
| JP | 2010-185719 | 8/2010 |
| JP | 2010-266380 | 11/2010 |
| JP | 2015-180895 | 10/2015 |

\* cited by examiner

LIGHT OBSERVATION APPARATUS

BACKGROUND

1. Technical Field

The present disclosure relates to a light observation apparatus.

2. Description of the Related Art

Conventionally, a technique for conducting an analysis of a physical object through the use of fluorescence characteristics has been under development. For example, Japanese Unexamined Patent Application Publication No. 2010-185719, Japanese Patent No. 3706914, Japanese Unexamined Patent Application Publication No. 2010-266380, and Japanese Patent No. 5985709 disclose conducting an analysis of a physical object by acquiring excitation emission matrix (EEM) information. EEM information, also referred to as "fluorescence fingerprint", means three-dimensional data that is obtained by measuring a fluorescence spectrum while irradiating a sample with continuously varied wavelengths of excitation light. In addition, a technology for acquiring information regarding a physical object by irradiating the physical object with light and measuring light reflected from the physical object has conventionally been under development.

SUMMARY

In one general aspect, the techniques disclosed here feature a light observation apparatus including: a first photodetector that, upon irradiation of at least part of a physical object with irradiation light, receives first light containing ambient light and at least one selected from the group consisting of reflected light returning from the at least part and fluorescence produced from the at least part, and that outputs a first output signal representing a reception intensity of the first light; a second photodetector, provided in a position that does not overlap an optical path of the at least one selected from the group consisting of the reflected light and the fluorescence, that receives second light containing the ambient light and outputs a second output signal representing a reception intensity of the second light; and a signal processing circuit. The signal processing circuit attenuates a first signal component corresponding to the ambient light from the first output signal based on the first output signal and the second output signal.

In one general aspect, the techniques disclosed here feature a light observation apparatus including: a first photodetector that, upon irradiation of a physical object with irradiation light having an excitation wavelength selected from among a plurality of excitation wavelengths differing from each other, receives first light containing fluorescence produced from the physical object and ambient light and that outputs a first output signal representing a reception intensity of the first light; and a signal processing circuit. The signal processing circuit attenuates a first signal component corresponding to the ambient light from the first output signal, the first signal component being a signal component, contained in the first output signal, whose correlation between a signal strength of the signal component and the excitation wavelength is smaller than a reference value.

In one general aspect, the techniques disclosed here feature a non-transitory computer-readable recording medium storing a program that, when executed by a computer, causes the computer to perform operations including: causing a first photodetector to, upon irradiation of at least part of a physical object with irradiation light, receive first light containing ambient light and at least one selected from the group consisting of reflected light returning from the at least part and fluorescence produced from the at least part, and to output a first output signal representing a reception intensity of the first light; causing a second photodetector to receive second light containing the ambient light and output a second output signal representing a reception intensity of the second light; and causing a signal processing circuit to attenuate a first signal component corresponding to the ambient light from the first output signal based on the first output signal and the second output signal.

In one general aspect, the techniques disclosed here feature a non-transitory computer-readable recording medium storing a program that, when executed by a computer, causes the computer to perform operations including: causing a first photodetector to, upon irradiation of a physical object with irradiation light having an excitation wavelength selected from among a plurality of excitation wavelengths differing from each other, receive first light containing fluorescence produced from the physical object and ambient light and to output a first output signal representing a reception intensity of the first light; and causing a signal processing circuit to attenuate a first signal component corresponding to the ambient light from the first output signal, the first signal component being a signal component, contained in the first output signal, whose correlation between a signal strength of the signal component and the excitation wavelength is smaller than a reference value.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Brief Overview of the Present Disclosure

Figure 1:
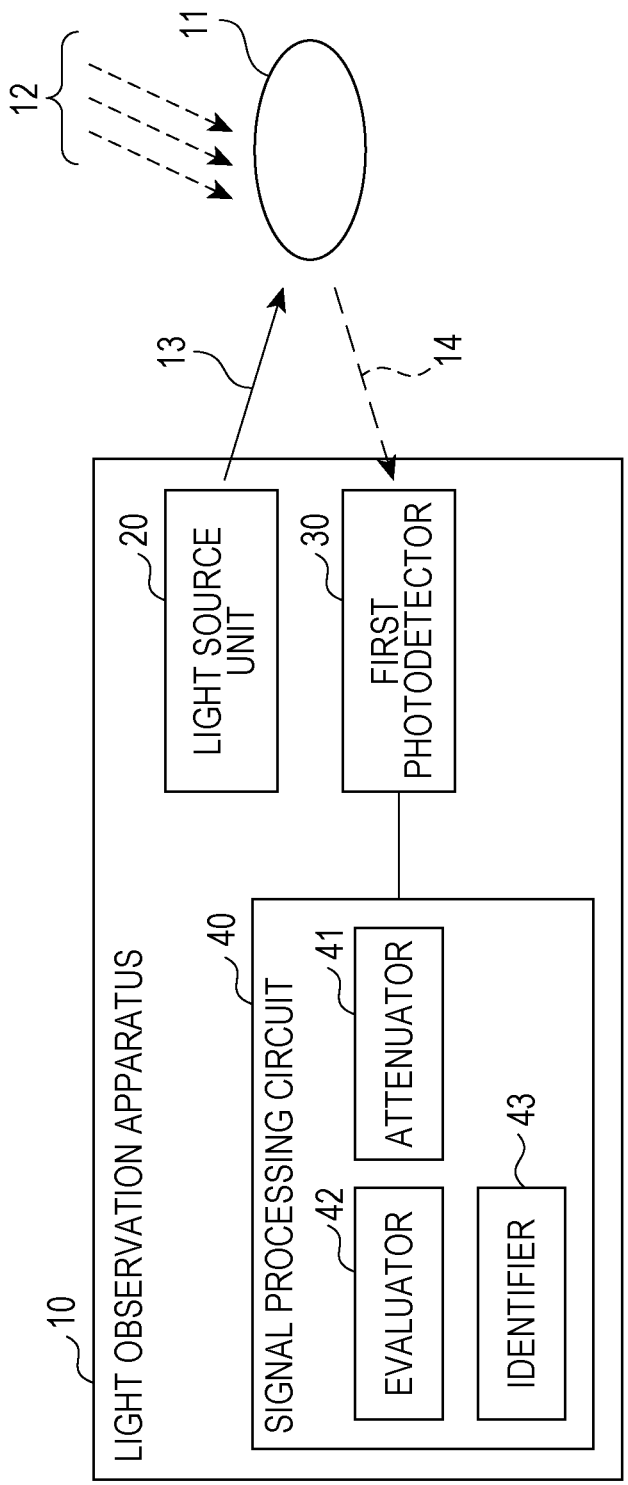
FIG. 1 is a block diagram showing a configuration of a light observation apparatus according to Embodiment 1.

In one aspect of the present disclosure, there is provided a light observation apparatus including: a first photodetector that, upon irradiation of at least part of a physical object with irradiation light, receives first light containing ambient light and at least one selected from the group consisting of reflected light returning from the at least part and fluorescence produced from the at least part, and that outputs a first output signal representing a reception intensity of the first light; a second photodetector, provided in a position that does not overlap an optical path of the at least one selected from the group consisting of the reflected light and the fluorescence, that receives second light containing the ambient light and outputs a second output signal representing a reception intensity of the second light; and a signal processing circuit. The signal processing circuit attenuates a first signal component corresponding to the ambient light from the first output signal based on the first output signal and the second output signal.

This makes it possible to suppress the effect of the ambient light by attenuating the signal component equivalent to the ambient light from the first output signal even in a case where the physical object is being irradiated with the ambient light. Accordingly, without being bound by limited conditions such as a dark room, the light observation apparatus according to the present aspect can be utilized for a componential analysis of a physical object located in a space illuminated with interior illumination light. In this way, the present aspect makes it possible to provide a highly-versatile light observation apparatus.

Further, the light observation apparatus includes the second photodetector; therefore, while the first photodetector is receiving light containing at least one selected from the group consisting of reflected light returning from the physical object and fluorescence produced from the physical object, the second photodetector can receive light not containing the at least one selected from the group consisting of the reflected light and the fluorescence. For example, since the second photodetector can be utilized exclusively to receive the ambient light, the reception intensity of the ambient light can be acquired with high accuracy. This makes it possible to also enhance the accuracy of analysis of the physical object with enhanced accuracy of fluorescence observation.

Further, for example, the irradiation light may have an excitation wavelength selected from among a plurality of excitation wavelengths differing from each other, and the first light may contain the fluorescence.

This makes it possible to detect an organic substance that produces fluorescence. For example, a human's vomit, pollen, and the like can be detected.

Further, for example, the first light may contain the reflected light.

This makes it possible to detect particulate matter, such as PM 2.5, that produces no fluorescence.

Further, for example, in the light observation apparatus according to one aspect of the present disclosure, each of the first and second photodetectors may include pixels, and the first and second photodetectors may constitute an image sensor.

This makes it possible to use a single image sensor as both the first and second photodetectors, thus making possible to simplify the configuration of the light observation apparatus.

Further, in another embodiment of the present disclosure, there is provided a light observation apparatus including: a first photodetector that, upon irradiation of a physical object with irradiation light having an excitation wavelength selected from among a plurality of excitation wavelengths differing from each other, receives first light containing fluorescence produced from the physical object and ambient light and that outputs a first output signal representing a reception intensity of the first light; and a signal processing circuit. The signal processing circuit attenuates a first signal component corresponding to the ambient light from the first output signal, the first signal component being a signal component, contained in the first output signal, whose correlation between a signal strength of the signal component and the excitation wavelength is smaller than a reference value.

While the intensity of fluorescence depends on excitation wavelength, the intensity of ambient light does not depend on excitation wavelength. That is, a component whose correlation between signal strength and excitation wavelength is small is estimated to be a component containing much ambient light. Accordingly, a signal component equivalent to the ambient light can be attenuated with high accuracy by attenuating a component whose correlation between signal strength and excitation wavelength is smaller than a reference value. As a result, without being bound by limited conditions such as a dark room, the light observation apparatus according to the present aspect can be utilized for a componential analysis of a physical object located in a space illuminated with interior illumination light. In this way, the present aspect makes it possible to provide a highly-versatile light observation apparatus. This makes it possible to also enhance the accuracy of analysis of component of the physical object with enhanced accuracy of fluorescence observation.

Further, for example, the first photodetector may receive the first light at a plurality of observation wavelengths differing from each other, the signal processing circuit may calculate, for each of the plurality of observation wavelengths, a difference absolute value between a signal strength of the first output signal corresponding to a first excitation wavelength selected from among the plurality of excitation wavelengths and a signal strength of the first output signal corresponding to a second excitation wavelength selected from among the plurality of excitation wavelengths, and in a case where the difference absolute value is not greater than a threshold, the signal processing circuit may attenuate the first signal component from the first output signal, the first signal component being a signal component, contained in the first output signal, that is at an observation wavelength corresponding to the difference absolute value.

This makes it possible to appropriately determine a component whose correlation between signal strength and excitation wavelength is small, thus making it possible to attenuate the signal component equivalent to the ambient light with high accuracy. This makes it possible to also enhance the accuracy of analysis of component of the physical object with enhanced accuracy of fluorescence observation.

Further, for example, in a case where the physical object is not being irradiated with the excitation light, the first photodetector may further receive second light that falls on the first photodetector and output a second output signal representing a reception intensity of the second light for each observation wavelength, and the signal processing circuit may attenuate the second output signal from the first output signal as a signal component equivalent to the ambient light.

As a result, since light is received in a case where fluorescence is hardly produced without irradiation with the excitation light, the light thus received turns into a component attributed to the ambient light. Accordingly, the reception intensity of the ambient light can be acquired with high accuracy; therefore, the accuracy of analysis of component of the physical object can also be enhanced with enhanced accuracy of fluorescence observation.

Further, for example, the signal processing circuit may further identify a component contained in the physical object based on a signal strength of the first output signal from which the first signal component has been attenuated.

This makes it possible to conduct a componential analysis of the physical object. For this reason, the light observation apparatus according to the present aspect can grasp on site what substance is present and can therefore immediately cope with the substance accordingly. For example, in a case where viruses have been detected, the viruses can be killed and use can be made, for example, for preventing infection.

Further, for example, the first photodetector may receive the first light at a plurality of observation wavelengths differing from each other, and the signal processing circuit may identify the component contained in the physical object by evaluating, for each combination of the plurality of excitation wavelengths and the plurality of observation wavelengths, the signal strength of the first output signal from which the first signal component has been attenuated.

This makes it possible to conduct a componential analysis of the physical object on the basis of a so-called fluorescence fingerprint.

Further, for example, the light observation apparatus according to one or another aspect of the present disclosure may further include a light source that irradiates the physical object with the irradiation light.

This makes it possible to irradiate the physical object with the irradiation light at a sufficient intensity to produce at least one selected from the group consisting of reflected light returning from the physical object and fluorescence produced from the physical object, as the light observation apparatus includes the light source. Accordingly, the light observation apparatus according to the present aspect is extremely high in versatility, as it can be utilized, for example, for a componential analysis of the physical object even in a case where the light source that emits the irradiation light is not located around the physical object.

Further, for example, the ambient light may be interior illumination light.

This makes it possible to, even in a room illuminated with illumination light, for example, from an LED (light-emitting diode), a fluorescent lamp, or the like, observe at least one selected from the group consisting of reflected light returning from the physical object and fluorescence produced from the physical object. For this reason, the light observation apparatus according to the present aspect can be used for componential analyses of not only a physical object disposed inside a dark room or a measurement device but also a physical object that is present in a daily living space, and is extremely high in versatility.

Specifically, utilizing viruses or bacteria as an example of the physical object makes it possible to utilized the light observation apparatus to confirm the location of viruses or bacteria that are present in a room. For example, the light observation apparatus can detect noroviruses having adhered when a norovirus-infected person touched a door knob, a table, or the like.

Further, for example, the physical object may be a human's vomit.

For example, in a case where a person has vomited onto a floor, a portion of the vomit so scatters that it is impossible to confirm, with the naked eye, to what extent it has scattered. There is a risk for the proliferation of viruses or the like in the case of remnants of the vomit that could not be completely cleaned up. The light observation apparatus according to the present aspect makes it possible, for example, to observe fluorescence produced by an organic substance contained in the remaining vomit, thus making it possible to confirm the location of the portion of the vomit that has scattered. Further, after the vomit has been cleaned up, utilizing the light observation apparatus according to the present aspect makes it possible to confirm whether the vomit remains. This makes it possible to confirm the effect of the clean-up.

Further, for example, the physical object may be a fine particle floating in a space.

This makes it possible to detect a fine particle such as pollen or dirt.

Further, in one aspect of the present disclosure, there is provided a light observation method including: upon irradiation of at least part of a physical object with irradiation light, acquiring a first output signal representing a reception intensity of first light containing at least one selected from the group consisting of reflected light returning from the at least part and fluorescence produced from the at least part and ambient light; acquiring a second output signal representing a reception intensity of second light containing the ambient light; and attenuating a first signal component equivalent to the ambient light from the first output signal on the basis of a calculation of the first output signal and the second output signal.

This makes it possible to achieve a high-versatile light observation method, as is the case of the aforementioned light observation apparatus.

Further, in one aspect of the present disclosure, there is provided a light observation method including: upon irradiation of a physical object with irradiation light having an excitation wavelength selected from among a plurality of excitation wavelengths differing from each other, acquiring a first output signal representing an intensity of first light containing fluorescence produced from the physical object and ambient light; and attenuating a first signal component equivalent to the ambient light from the first output signal, the first signal component being a signal component, contained in the first output signal, whose correlation between a signal strength of the signal component and the excitation wavelength is smaller than a reference value.

This makes it possible to achieve a high-versatile light observation method, as is the case of the aforementioned light observation apparatus.

Further, in one aspect of the present disclosure, there is provided a program that, when executed by a computer, causes the computer to perform operations including: causing a first photodetector to, upon irradiation of at least part of a physical object with irradiation light, receive first light containing at least one selected from the group consisting of reflected light returning from the at least part and fluorescence produced from the at least part and ambient light and output a first output signal representing a reception intensity of the first light; causing a second photodetector to receive second light containing the ambient light and output a second output signal representing a reception intensity of the second light; and causing a signal processing circuit to attenuate a first signal component equivalent to the ambient light from the first output signal on the basis of a calculation of the first output signal and the second output signal.

Further, in another aspect of the present disclosure, there is provided a program that, when executed by a computer, causes the computer to perform operations including: causing a first photodetector to, upon irradiation of a physical object with irradiation light having an excitation wavelength selected from among a plurality of excitation wavelengths differing from each other, receive first light containing fluorescence produced from the physical object and ambient light and output a first output signal representing a reception intensity of the first light; and causing a signal processing circuit to attenuate a first signal component equivalent to the ambient light from the first output signal, the first signal component being a signal component, contained in the first output signal, whose correlation between a signal strength of the signal component and the excitation wavelength is smaller than a reference value.

Further, in one aspect of the present disclosure, there is provided a non-transitory computer-readable recording medium storing a program that, when executed by a computer, causes the computer to perform operations including: causing a first photodetector to, upon irradiation of at least part of a physical object with irradiation light, receive first light containing ambient light and at least one selected from the group consisting of reflected light returning from the at least part and fluorescence produced from the at least part, and to output a first output signal representing a reception intensity of the first light; causing a second photodetector to receive second light containing the ambient light and output a second output signal representing a reception intensity of the second light; and causing a signal processing circuit to attenuate a first signal component corresponding to the ambient light from the first output signal based on the first output signal and the second output signal.

Further, in another aspect of the present disclosure, there is provided a non-transitory computer-readable recording medium storing a program that, when executed by a computer, causes the computer to perform operations including: causing a first photodetector to, upon irradiation of a physical object with irradiation light having an excitation wavelength selected from among a plurality of excitation wavelengths differing from each other, receive first light containing fluorescence produced from the physical object and ambient light and to output a first output signal representing a reception intensity of the first light; and causing a signal processing circuit to attenuate a first signal component corresponding to the ambient light from the first output signal, the first signal component being a signal component, contained in the first output signal, whose correlation between a signal strength of the signal component and the excitation wavelength is smaller than a reference value.

In the present disclosure, all or a part of any of circuit, unit, device, part or portion, or any of functional blocks in the block diagrams may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

The following describes embodiments in concrete terms with reference to the drawings.

It should be noted that the embodiments to be described below illustrate general or specific examples. The numerical values, shapes, materials, constituent elements, locations of placement and forms of connection of constituent elements, steps, and orders of steps that are shown in the following embodiments are mere examples and are not intended to limit the present disclosure. Further, those of the constituent elements according to the following embodiments which are not recited in an independent claim representing the most generic concept are described as optional constituent elements.

Further, the drawings are schematic views and ae not necessarily strict illustrations. Accordingly, for example, the drawings are not necessarily to scale. Further, the drawings assign identical signs to substantially identical components and omit or simplify repeated descriptions.

Embodiment 1

1-1. Brief Overview

First, a brief overview of a light observation apparatus according to Embodiment 1 is provided with reference to FIG. 1. FIG. 1 is a block diagram showing a configuration of a light observation apparatus 10 according to Embodiment 1.

The light observation apparatus 10 receives light containing at least one selected from the group consisting of reflected light returning from a physical object 11 and fluorescence produced from the physical object 11 upon irradiation of the physical object 11 with irradiation light and senses the physical object 11 on the basis of the intensity of the at least one contained in the light thus received. Specifically, the light observation apparatus 10 is a fluorescence observation apparatus and, as shown in FIG. 1, receives first light 14 containing fluorescence produced from the physical object 11 upon irradiation of the physical object 11 with excitation light 13 and generates a fluorescence fingerprint on the basis of the fluorescence contained in the first light 14 (hereinafter referred to as "observed light") thus received. The light observation apparatus 10 further conducts a componential analysis of the physical object 11 on the basis of the fluorescence fingerprint.

In Embodiment 1, the physical object 11 is being irradiated with ambient light 12. For this reason, the observed light contains not only the fluorescence but also the ambient light 12. Accordingly, the light observation apparatus 10 according to Embodiment 1 generates a signal equivalent to a fluorescence component by attenuating a signal component equivalent to the ambient light 12 from an output signal representing the reception intensity of observed light received by a first photodetector 30. The light observation apparatus 10 generates a fluorescence fingerprint on the basis of the signal from which the signal component equivalent to the ambient light 12 has been attenuated.

The ambient light 12 is for example interior illumination light. The interior illumination light is specifically white light that is emitted from a fluorescent lamp, an LED lamp, or the like.

The physical object 11 is for example a human's vomit. The vomit contains organic substances that emit fluorescence upon irradiation with the excitation light 13. Examples of the organic substances include, but are not limited to, triptophan, tyrosine, vitamin A, vitamin B2, NADH (nicotinamide adenine dinucleotide), and the like.

Triptophan produces fluorescence with a peak at 310 nm upon irradiation with the excitation light 13 at an excitation wavelength of 280 nm. Furthermore, triptophan also produces fluorescence with a peak at 310 nm upon irradiation with the excitation light 13 at an excitation wavelength of 270 nm.

Tyrosine produces fluorescence with a peak at 300 nm upon irradiation with the excitation light 13 at an excitation wavelength of 275 nm. Vitamin A produces fluorescence with a peak at 425 nm upon irradiation with the excitation light 13 at an excitation wavelength of 325 nm. Vitamin B2 produces fluorescence with a peak at 520 nm upon irradiation with the excitation light 13 at an excitation wavelength of 450 nm. NADH produces fluorescence with a peak at 460 nm upon irradiation with the excitation light 13 at an excitation wavelength of 350 nm.

The physical object 11 may be a fine particle floating in a space. Specifically, the physical object 11 may be an organic substance such as pollen, house dust, or the like floating in a space. For example, irradiating a protein constituting pollen with the excitation light 13 excites the protein to produce fluorescence.

In this way, each substance has a predetermined combination of an effective excitation wavelength and the wavelength of fluorescence produced by the excitation light 13 at that excitation wavelength. Accordingly, the light observation apparatus 10 can identify a component of the physical object 11 by identifying a combination of the wavelength (i.e. excitation wavelength) of the excitation light 13 emitted and the wavelength of the fluorescence observed.

1-2. Configuration

Figure 2:
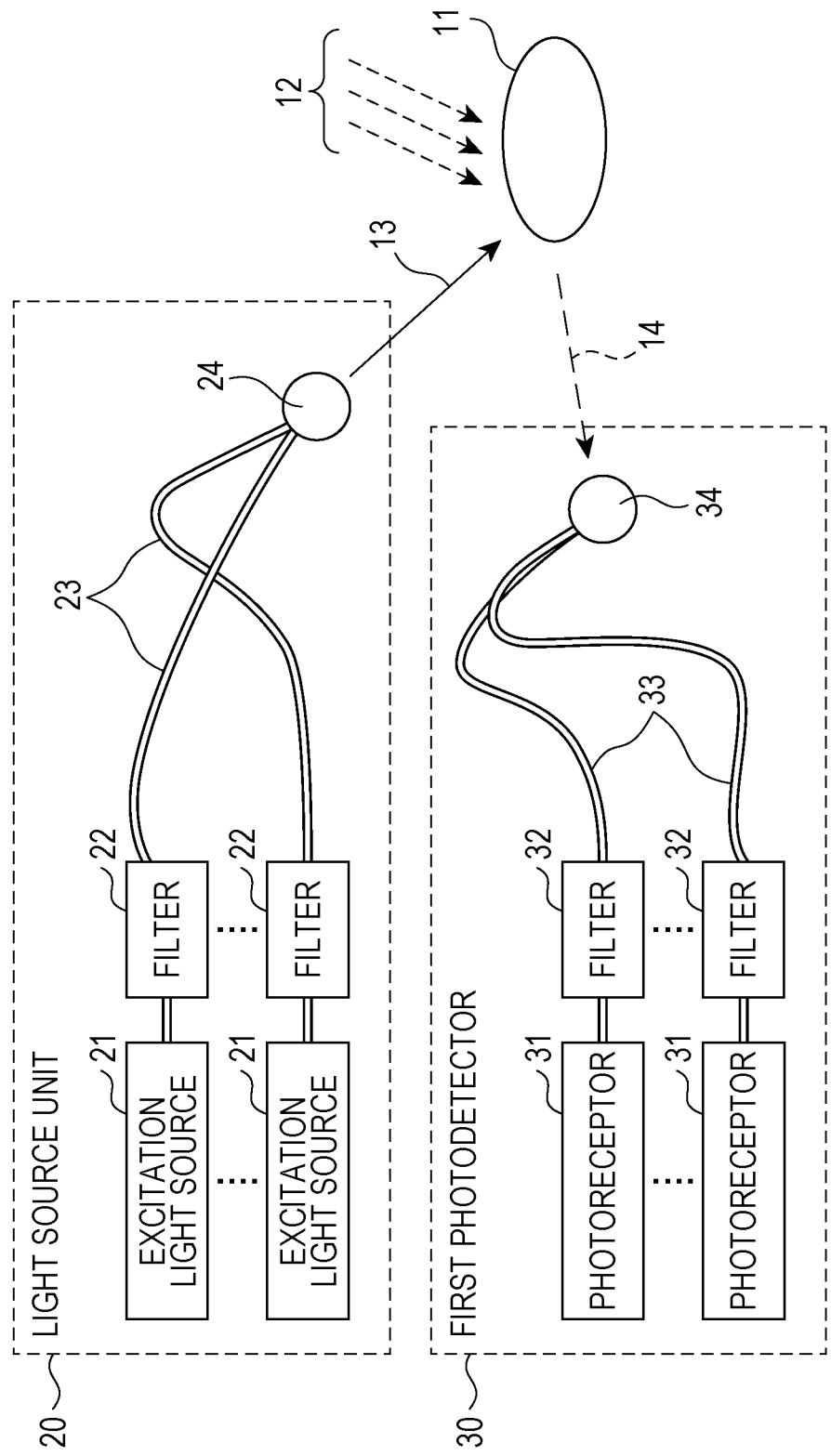
FIG. 2 is a diagram showing a specific configuration of a light source unit and a first photodetector of the light observation apparatus according to Embodiment 1.

Next, a configuration of the light observation apparatus 10 is described with reference to FIGS. 1 and 2. FIG. 2 is a diagram showing a specific configuration of a light source unit 20 and a first photodetector 30 of the light observation apparatus 10 according to Embodiment 1.

As shown in FIGS. 1 and 2, the light observation apparatus 10 includes the light source unit 20, the first photodetector 30, and a signal processing circuit 40. It should be noted that FIG. 2 omits to illustrate the signal processing circuit 40.

1-2-1. Light Source Unit

The light source unit 20 is an example of a light source that irradiates the physical object 11 with irradiation light. The light source unit 20 irradiates the physical object 11 with the excitation light 13, which is an example of the irradiation light. In Embodiment 1, the light source unit 20 irradiates the physical object 11 with a plurality of rays of the excitation light 13 differing in excitation wavelength from each other. Specifically, as shown in FIG. 2, the light source unit 20 includes a plurality of excitation light sources 21, a plurality of filters 22, a plurality of optical fibers 23, and a light-emitting lens 24.

Each of the plurality of excitation light sources 21 is a light source that emits light (white light) having a wide wavelength band. Examples of the plurality of excitation light sources 21 include, but are not limited to, discharge lamps such as halogen lamps or solid light-emitting elements such as LEDs.

The plurality of filters 22 are provided in one-to-one correspondence with the plurality of excitation light sources 21. Each of the plurality of filters 22 is provided on an optical path formed by an optical fiber 23 connecting the corresponding excitation light source 21 to the light-emitting lens 24.

Each of the plurality of filters 22 is a bandpass filter whose center wavelength is an excitation wavelength to which the filter 22 corresponds. Each of the plurality of filters 22 has a bandwidth of, for example, 10 nm or wider to 50 nm or narrower. The plurality of filters 22 have passbands that for example do not overlap each other. Each of the plurality of filters 22 allows passage of light of the corresponding excitation wavelength contained in light emitted from the corresponding excitation light source 21.

For example, the light source unit 20 includes six excitation light sources 21 and six filters 22 respectively corresponding to the six excitation wavelengths. The six excitation wavelengths are for example 270 nm, 275 nm, 280 nm, 325 nm, 350 nm, and 450 nm. These wavelengths are wavelengths selected in advance according to the type of the physical object 11. The wavelengths used here are, but are not limited to, excitation wavelengths that are effective as the excitation light 13 for triptophan, tyrosine, vitamin A, vitamin B2, and NADH, which have been mentioned above. Further, the number of excitation light sources 21 that the light source unit 20 includes is not limited to six but may be two, ten, or more than ten.

The plurality of optical fibers 23 are provided, for example, in one-to-one correspondence with the plurality of excitation light sources 21. Each of the plurality of optical fibers 23 connects the corresponding excitation light source 21 to the light-emitting lens 24, and forms an optical path along which the excitation light 13 emitted by the excitation light source 21 is guided toward the light-emitting lens 24.

The light-emitting lens 24 is a translucent lens for emitting the excitation light 13 toward the physical object 11.

Alternatively, the light source unit 20 may include only one excitation light source 21 that emits an excitation wavelength having a sufficient intensity in a wide range including a plurality of excitation wavelengths. In this case, switching the plurality of filters 22 for each separate excitation wavelength allows the light source unit 20 to irradiate the physical object 11 with the excitation light 13 for each separate excitation wavelength. Further, the light source unit 20 may include a plurality of excitation light sources 21 that emit light with peaks at wavelengths differing from each other.

The light source unit 20 may irradiate the physical object 11 with time-continuously varied wavelengths of the excitation light 13. For example, the light source unit 20 may sequentially irradiate the physical object 11 with a plurality of rays of the excitation light 13 differing in excitation wavelength from each other with excitation wavelengths varied in 10 nm increments in a range of 220 nm or longer to 550 nm or shorter.

Further, the configuration of the light source unit 20 as shown in FIG. 2 is a mere example, and the light source unit 20 does not need to include the optical fibers 23 or the light-emitting lens 24.

1-2-2. First Photodetector

The first photodetector 30 receives first light 14 containing at least one selected from the group consisting of reflected light returning from the physical object 11 and fluorescence produced from the physical object 11 upon irradiation of the physical object 11 with irradiation light from the light source unit 20 and ambient light 12 and outputs a first output signal representing the reception intensity of the first light 14. In Embodiment 1, the irradiation light is excitation light 13 having an excitation wavelength selected from among a plurality of excitation wavelengths differing from each other. The at least one contained in the first light 14 is fluorescence that is produced from the physical object 11 upon excitation by the irradiation light. That is, in Embodiment 1, the observed light, which is the first light 14, contains the fluorescence produced from the physical object 11 and the ambient light 12.

Specifically, the first photodetector 30 receives first light 14 containing fluorescence that, upon irradiation with excitation light 13 having an excitation wavelength selected from among a plurality of excitation wavelengths differing from each other, is produced from the physical object 11 upon excitation by the excitation light 13, and outputs a first output signal representing the reception intensity of the first light 14 for each observation wavelength. As mentioned above, the first light 14 contains not only the fluorescence but also ambient light 12. Further, since the physical object 11 is being irradiated with the ambient light 12, the first light 14 contains ambient light 12 reflected by the physical object 11.

In Embodiment 1, the first output signal contains a plurality of output signals for each separate excitation wavelength. That is, the first photodetector 30 outputs output signals respectively corresponding to the plurality of excitation wavelengths. The signal strengths of the output signals for each separate excitation wavelength represent reception intensities for each separate observation wavelength.

As shown in FIG. 2, the first photodetector 30 includes a plurality of photoreceptors 31, a plurality of filters 32, a plurality of optical fibers 33, and a light-receiving lens 34.

Each of the plurality of photoreceptors 31 receives light from the physical object 11 and outputs an electrical signal representing the intensity of the light thus received. Specifically, each of the plurality of photoreceptors 31 is a photoelectric conversion element such as a photodiode. Each of the plurality of photoreceptors 31 receives light having passed through a corresponding one of the filters 32 and therefore outputs a signal representing the reception intensity for each wavelength of the light transmitted by the filter 32.

The plurality of filters 32 are provided in one-to-one correspondence with the plurality of photoreceptors 31. The plurality of filters 32 are bandpass filters whose center wavelengths are wavelengths differing from each other and that have bandwidths of 10 nm or wider to 50 nm or narrower. The plurality of filters 32 have transmission bands that for example do not overlap each other.

For example, the first photodetector 30 includes five photoreceptors 31 and five filters 32. The five filters 32 transmit light with wavelengths (i.e. observation wavelengths) of, for example, 300 nm, 310 nm, 425 nm, 460 nm, and 520 nm, respectively. These wavelengths are wavelengths selected in advance according to the type of the physical object 11. The wavelengths used here are, but are not limited to, wavelengths of fluorescence that are emitted by triptophan, tyrosine, vitamin A, vitamin B2, and NADH, which have been mentioned above. Further, the numbers of photoreceptors 31 and filters 32 that the first photodetector 30 includes are not limited to five but may be two, ten, or more than ten.

The plurality of optical fibers 33 are provided in one-to-one correspondence with the plurality of photoreceptors 31. Each of the optical fibers 33 connects the corresponding photoreceptor 31 to the light-receiving lens 34, and forms an optical path along which light (i.e. observed light) having fallen on the light-receiving lens 34 is guided toward each of the plurality of photoreceptors 31.

The light-receiving lens 34 is a translucent lens on which light arriving from the physical object 11 falls.

Alternatively, the first photodetector 30 may include only one photoreceptor 31 having a sufficient sensitivity in a wide range including a plurality of observation wavelengths. In this case, for example, by causing the plurality of filters 32 to function in sequence (or specifically, causing the observed light to be transmitted to the plurality of optical fibers 33 in sequence), the photoreceptor 31 can receive light for each observation wavelength in sequence.

For example, the first photodetector 30 may receive the observed light with time-continuously varied wavelengths of light to be received. For example, the first photodetector 30 may receive the observed light with target wavelengths varied in 1 nm increments in a range of 230 nm or longer to 700 nm of shorter. This allows the first photodetector 30 to generate and output a first output signal with high wavelength resolution.

Further, the configuration of the first photodetector 30 as shown in FIG. 2 is a mere example, and the first photodetector 30 does not need to include the optical fibers 33 or the light-receiving lens 34.

1-2-3. Signal Processing Circuit

The signal processing circuit 40 processes a first output signal that is outputted from the first photodetector 30. The signal processing circuit 40 is realized, for example, by an integrated circuit including a processor and the like.

Specifically, as shown in FIG. 1, the signal processing circuit 40 includes an attenuator 41, an evaluator 42, and an identifier 43.

The attenuator 41 attenuates, from the first output signal, a signal component, contained in the first output signal, whose correlation between a signal strength of the signal component and the excitation wavelength is smaller than a reference value. Specifically, the signal component, contained in the first output signal, whose correlation between the signal strength of the signal component and the excitation wavelength is smaller than the reference value is a signal component equivalent to the ambient light 12. That is, the attenuator 41 attenuates the signal component equivalent to the ambient light 12 from the first output signal and thereby generates a signal from which the signal component equivalent to the ambient light 12 has been attenuated.

Specifically, the attenuator 41 calculates, for each observation wavelength, a difference absolute value between a signal strength corresponding to a first excitation wavelength selected from among the plurality of excitation wavelengths and a signal strength corresponding to a second excitation wavelength selected from among the plurality of excitation wavelengths. Furthermore, in a case where the difference absolute value thus calculated is not greater than a threshold, the attenuator 41 attenuates a signal component at an observation wavelength corresponding to the difference absolute value.

For example, the attenuator 41 attenuates, to $\frac{1}{10}$, the strength of a signal component at an observation wavelength corresponding to a difference absolute value not greater than the threshold. The degree of attenuation is not limited to this but may range from $\frac{1}{2}$ to $\frac{1}{100}$. Further, the attenuator 41 may null the strength of a signal component at a wavelength to be attenuated.

The evaluator 42 evaluates, for each combination of an excitation wavelength and an observation wavelength, the signal strength of the first output signal from which the signal component has been attenuated. Specifically, the evaluator 42 generates a fluorescence fingerprint on the basis of the signal from which the signal component equivalent to the ambient light 12 has been attenuated.

Figure 3:
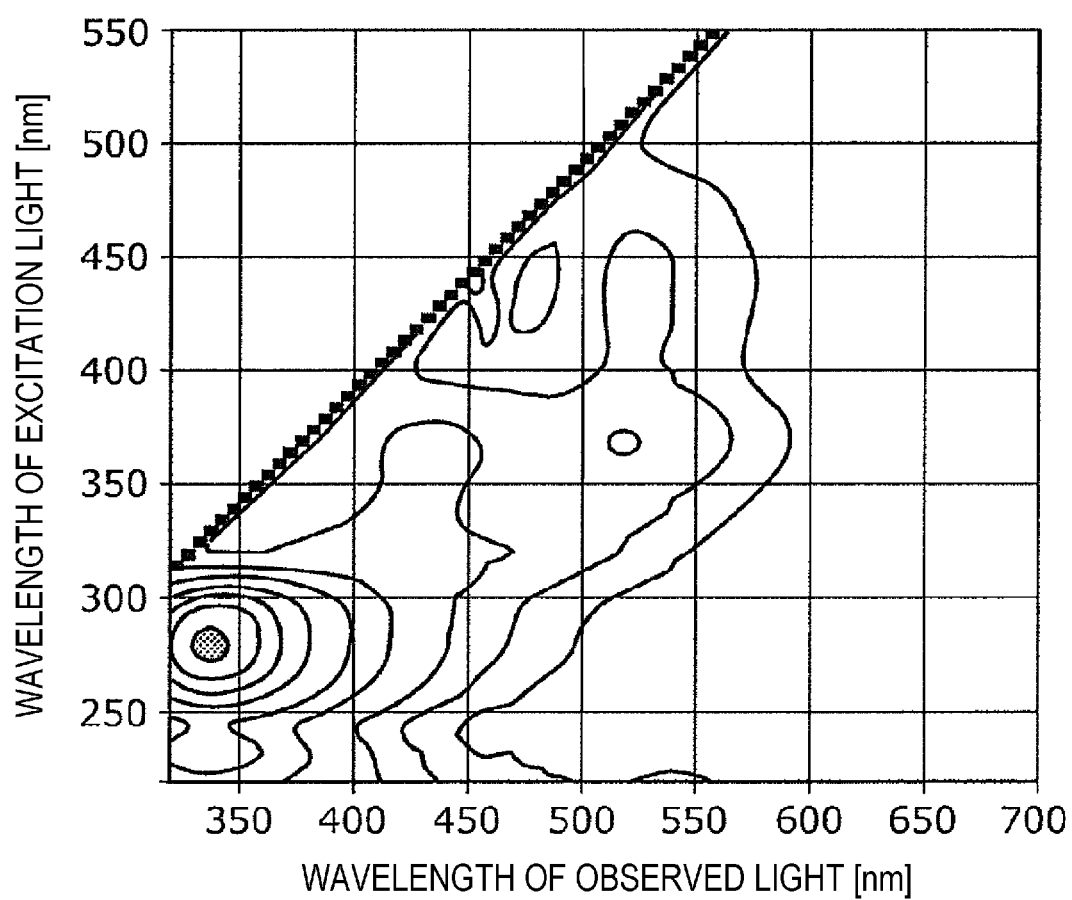
FIG. 3 is a diagram showing an example of an ideal fluorescence fingerprint in the absence of ambient light.

FIG. 3 is a diagram showing an example of an ideal fluorescence fingerprint in the absence of the ambient light 12. The fluorescence fingerprint is three-dimensional data that is represented by a signal strength (or specifically, the intensity of fluorescence) with respect to a combination of the wavelength of the excitation light 13 and the wavelength of the observed light (or specifically, the fluorescence).

FIG. 3 shows two-dimensional coordinates whose vertical axis represents the wavelength of the excitation light 13 (i.e. excitation wavelength) and whose horizontal axis represents the wavelength of the observed light (i.e. observation wavelength) and, on the two-dimensional coordinates, illustrates isointensity lines continuously connecting coordinates of equal signal strength. Further, FIG. 3 applies half-tone dot meshing to the area of the highest signal strength. Although not clearly expressed in FIG. 3, the example shown in FIG. 3 shows an example of a fluorescence fingerprint with a high signal strength at an excitation wavelength of 280 nm and an observation wavelength of 340 nm. Further, FIG. 3 shows the results of observations made in 5 nm increments of both excitation wavelength and observation wavelength.

As shown in FIG. 3, the fluorescence that is produced from the physical object 11 has wavelength dependency (i.e. excitation wavelength dependency) on the excitation light 13.

The identifier 43 identifies a component of the physical object 11 on the basis of the signal strength of the first output signal from which the signal component has been attenuated. Specifically, the identifier 43 identifies a component of the physical object 11 on the basis of a signal strength for each combination of an excitation wavelength and an observation wavelength. The identifier 43 identifies a substance contained in the physical object 11 with reference to a table of association between substances and wavelengths.

The table of association associates a plurality of substances such as organic substances with combinations of an effective excitation wavelength and a wavelength of fluorescence (hereinafter referred to as "fluorescence wavelength") that is produced upon irradiation with the excitation light 13 at that excitation wavelength. For example, the substance "tryptophan" is associated with excitation wavelengths of 270 nm and 280 nm and a fluorescence wavelength of 310 nm. The same applies to tyrosine, vitamin A, vitamin B2, NADH, other organic substances, and the like.

The table of association is stored in a memory provided in the identifier 43. However, this is not intended to impose any limitation. For example, the table of association may be stored in another apparatus such as a server apparatus, and the identifier 43 may refer to the table of association by communicating with the apparatus.

In Embodiment 1, the identifier 43 identifies, for example, a combination with a high signal strength from among a plurality of combinations of an excitation wavelength and an observation wavelength on the basis of a fluorescence fingerprint. For example, the identifier 43 identifies a combination of an excitation wavelength and an observation wavelength at which the fluorescence fingerprint reaches its maximum signal strength, refers to the table of association on the basis of the combination thus identified, and thereby identifies a substance corresponding to the combination thus identified. For example, in a case where the combination of an excitation wavelength and an observation wavelength at which the signal strength reaches its maximum is a combination of excitation wavelengths of 270 nm and 280 nm and a fluorescence wavelength of 310 nm, the identifier 43 identifies triptophan as being contained in the physical object 11. A result identified by the identifier 43 is for example outputted together with the fluorescence fingerprint.

1-3. Operation

Figure 4:
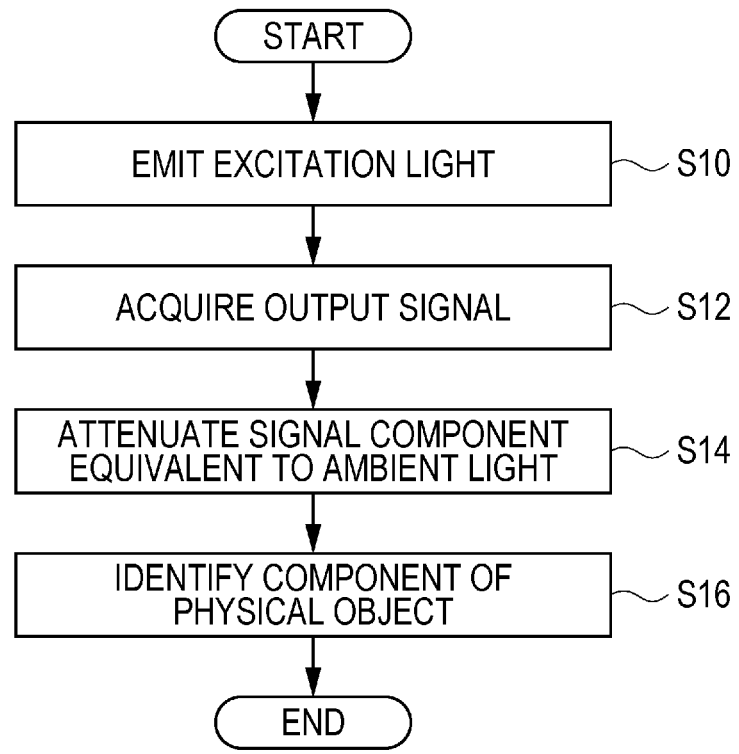
FIG. 4 is a flow chart showing operation of the light observation apparatus according to Embodiment 1.

Next, operation of the light observation apparatus 10 according to Embodiment 1 is described with reference to FIG. 4. FIG. 4 is a flow chart showing the operation of the light observation apparatus 10 according to Embodiment 1.

A description is given here by taking a human's vomit as an example of the physical object 11. For example, when a patient or a care receiver has vomited in a hospital or a care facility, a staff member wipes off the vomit. After that, the light observation apparatus 10 according to Embodiment 1 is utilized to detect the presence or absence of remnants of the vomit over the place where the vomit has been wiped off and the vicinity of the place.

The hospital or the care facility is installed with a lighting device such as a fluorescent lamp. Light emitted from the lighting device is used as the ambient light 12 to irradiate the place where the vomit has been wiped off and the vicinity of the place.

Figure 5:
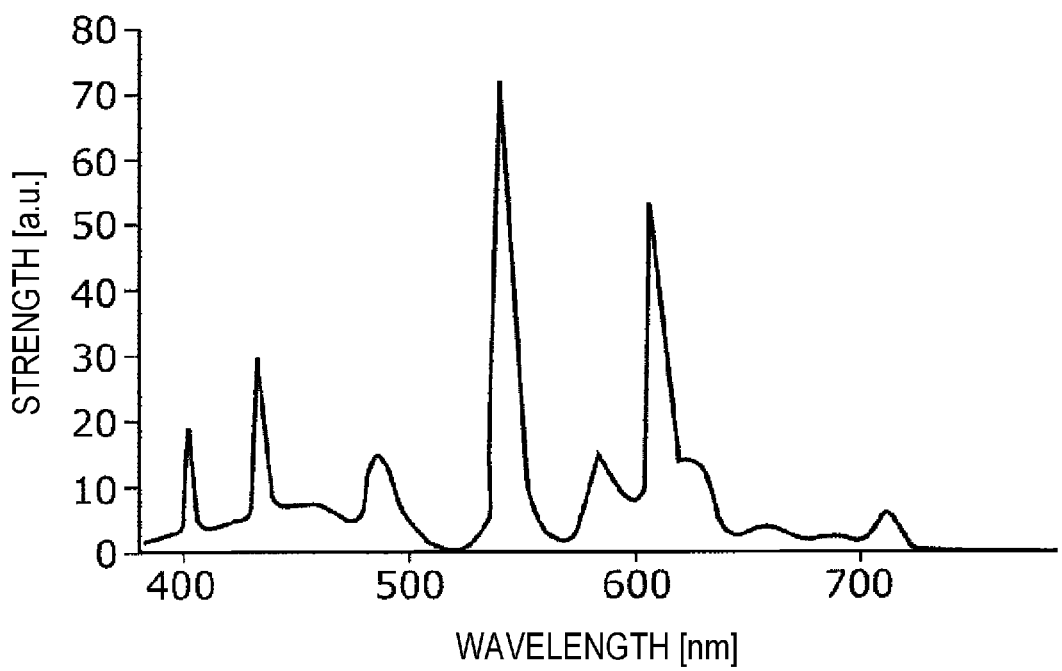
FIG. 5 is a diagram showing an example of an spectrum of ambient light.

FIG. 5 is a diagram showing an example of a spectrum of the ambient light 12. Specifically, FIG. 5 shows a spectrum of white light emitted from a fluorescent lamp. As shown in FIG. 5, the ambient light 12 contains a wavelength component of a visible light band and has peaks at predetermined wavelengths. In the example shown in FIG. 5, the wavelengths of the peaks (i.e. the peak wavelengths) of the ambient light 12 are 400 nm, 430 nm, 480 nm, 540 nm, and 610 nm.

As shown in FIG. 4, first, the light source unit 20 irradiates the physical object 11 with the excitation light 13 (S10). Specifically, the light source unit 20 causes the plurality of excitation light sources 21 to glow in sequence and thereby sequentially irradiates the physical object 11 with a plurality of rays of the excitation light 13 differing in excitation wavelength from each other. For example, the physical object 11 is irradiated with the excitation light 13 in the order of 270 nm, 275 nm, 280 nm, 325 nm, 350 nm, and then 450 nm.

The first photodetector 30 receives light from the physical object 11 every time the physical object 11 is irradiated with the excitation light 13 at a different excitation wavelength, and generates an output signal representing the reception intensity of the light thus received (S12). That is, the first photodetector 30 generates an output signal for each excitation wavelength.

Specifically, upon reception of the excitation light 13 at one excitation wavelength (e.g. 270 nm), all of the photoreceptors 31 receive, for each separate observation wavelength, observed light emitted from the physical object 11. All of the photoreceptors 31 photoelectrically convert the light thus received and thereby generate output signals representing the reception intensities of the observation wavelengths, respectively. The output signals from the photoreceptors 31 can be combined into an output signal representing reception intensities for each separate observation wavelength with respect to the excitation light 13 emitted. By generating an output signal every time the excitation light 13 is emitted, the first photodetector 30 generates output signals for each separate excitation wavelength and outputs them to the signal processing circuit 40. As a result, the first photodetector 30 outputs a first output signal containing output signals for each separate excitation wavelength.

Figure 6:
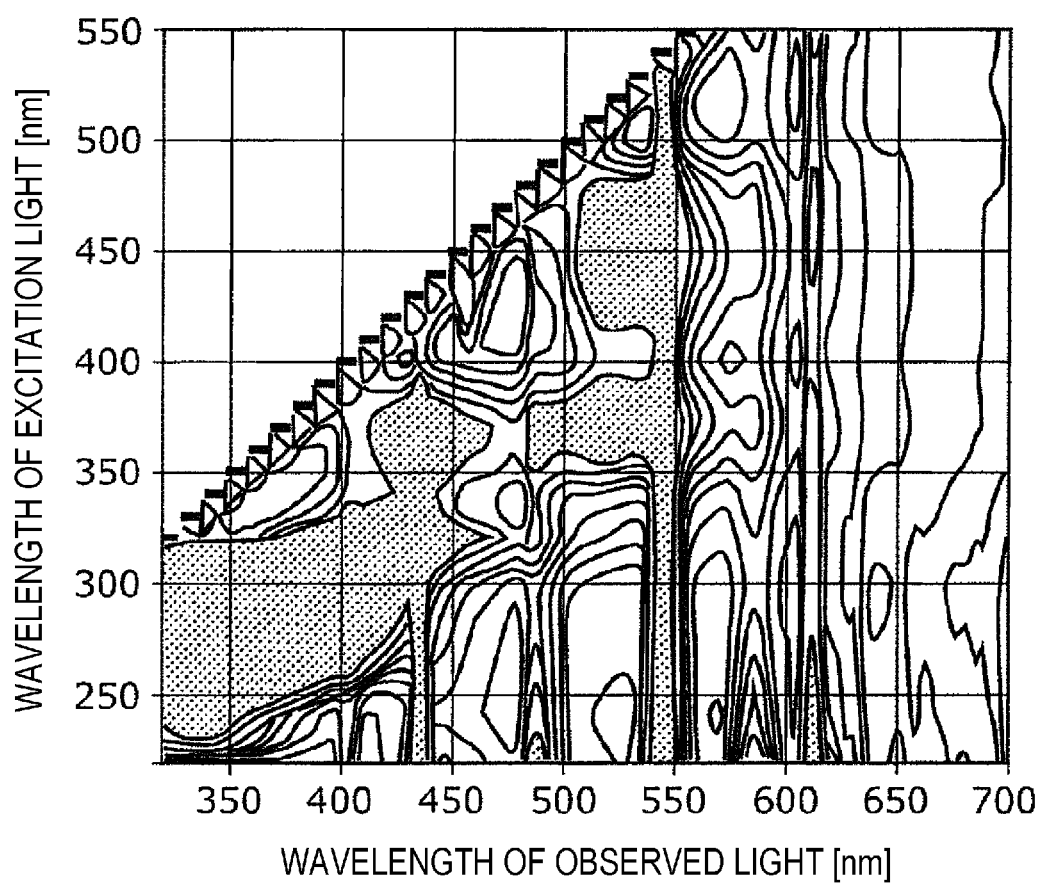
FIG. 6 is a diagram showing an example of a fluorescence fingerprint based on an output signal outputted by the first photodetector of the light observation apparatus according to Embodiment 1.

FIG. 6 is a diagram showing an example of a fluorescence fingerprint based on an output signal outputted by the first photodetector 30 of the light observation apparatus 10 according to Embodiment 1. FIG. 6 shows two-dimensional coordinates whose vertical axis represents excitation wavelength and whose horizontal axis represents observation wavelength and, on the two-dimensional coordinates, illustrates isointensity lines continuously connecting coordinates of equal signal strength. Further, FIG. 6 applies half-tone dot meshing to the areas of the highest signal strength.

Figure 7:
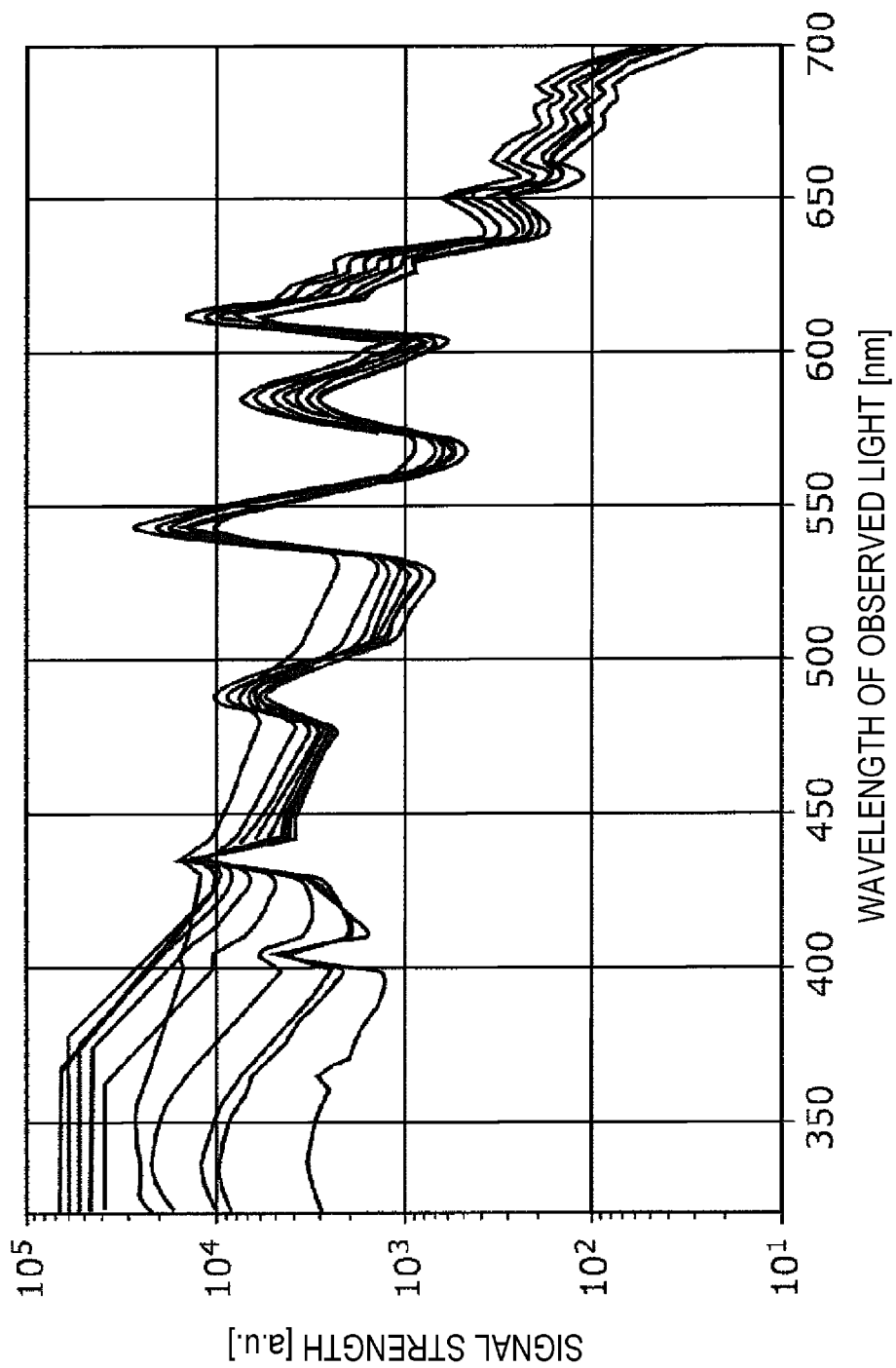
FIG. 7 is a diagram showing an output signal outputted by the first photodetector of the light observation apparatus according to Embodiment 1.

FIG. 7 is a diagram showing an output signal outputted by the first photodetector 30 of the light observation apparatus 10 according to Embodiment 1. In FIG. 7, the horizontal axis represents observation wavelength, and the vertical axis represents the signal strength of an output signal. The plurality of lines on the graph in FIG. 7 represent output signals for each separate excitation wavelength. Note here that the excitation wavelengths are ten types of wavelength selected in 10 nm increments from a range of 220 nm or longer to 310 nm or shorter.

Specifically, the line on the graph in FIG. 7 with the lowest signal strength in a position at an observation wavelength of 350 nm represents an output signal with an excitation wavelength of 220 nm, and the line on the graph in FIG. 7 with the highest signal strength in the position at an observation wavelength of 350 nm represents an output signal with an excitation wavelength of 310 nm. The excitation wavelength becomes longer in the order of the lines with the lowest to highest signal strengths in the position at an observation wavelength of 350 nm.

It should be noted that FIGS. 6 and 7 differ only graphically from each other and represent the same first output signal.

As can be seen from FIG. 6, longitudinal areas with high signal strengths appear at observation wavelengths of 430 nm, 480 nm, 540 nm, and 610 nm. This means that at observation wavelengths of 430 nm, 480 nm, 540 nm, and 610 nm, high intensities of observed light were received regardless of excitation wavelength. These observation wavelengths are equivalent to the peak wavelengths of the ambient light 12 as shown in FIG. 5.

In FIG. 7, similarly, at the peak wavelengths of the ambient light 12, or specifically, 430 nm, 480 nm, 540 nm, and 610 nm, there are high signal strengths regardless of excitation wavelength. That is, the ambient light 12 does not have excitation wavelength dependency. By attenuating these components of the ambient light 12, the intensity of fluorescence from the physical object 11 can be acquired.

In Embodiment 1, with continued reference to FIG. 4, the attenuator 41 of the signal processing circuit 40 attenuates the signal component equivalent to the ambient light 12 from the first output signal (S14). Specifically, first, the attenuator 41 selects two given excitation wavelengths from among the plurality of excitation wavelengths of the excitation light 13 with which the physical object 11 has been irradiated. In this one example, the attenuator 41 selects 240 nm as the first excitation wavelength and 270 nm as the second excitation wavelength.

Next, the attenuator 41 calculates, for each observation wavelength, a difference absolute value between the signal strength of an output signal corresponding to the first excitation wavelength thus selected and the signal strength of an output signal corresponding to the second excitation wavelength thus selected. Furthermore, the attenuator 41 determines, for each observation wavelength, whether the difference absolute value thus calculated is not greater than a predetermined threshold.

The attenuator 41 estimates that an observation wavelength at which the difference absolute value is not greater than the threshold is a wavelength component contained in the ambient light 12, and attenuates a signal component at the observation wavelength. In the examples shown in FIGS. 6 and 7, the attenuator 41 attenuates signal components at observation wavelengths of 430 nm, 480 nm, 540 nm, and 610 nm. For example, the attenuator 41 reduces the signal strengths of the first output signal at observation wavelengths of 430 nm, 480 nm, 540 nm, and 610 nm to ⅒. Specifically, the attenuator 41 reduces, to ⅒, the signal strength of each of the output signals for each separate excitation wavelength that constitute the first output signal. Signals obtained by thus attenuating the signal components equivalent to the ambient light 12 are shown in FIGS. 8 and 9.

Figure 8:
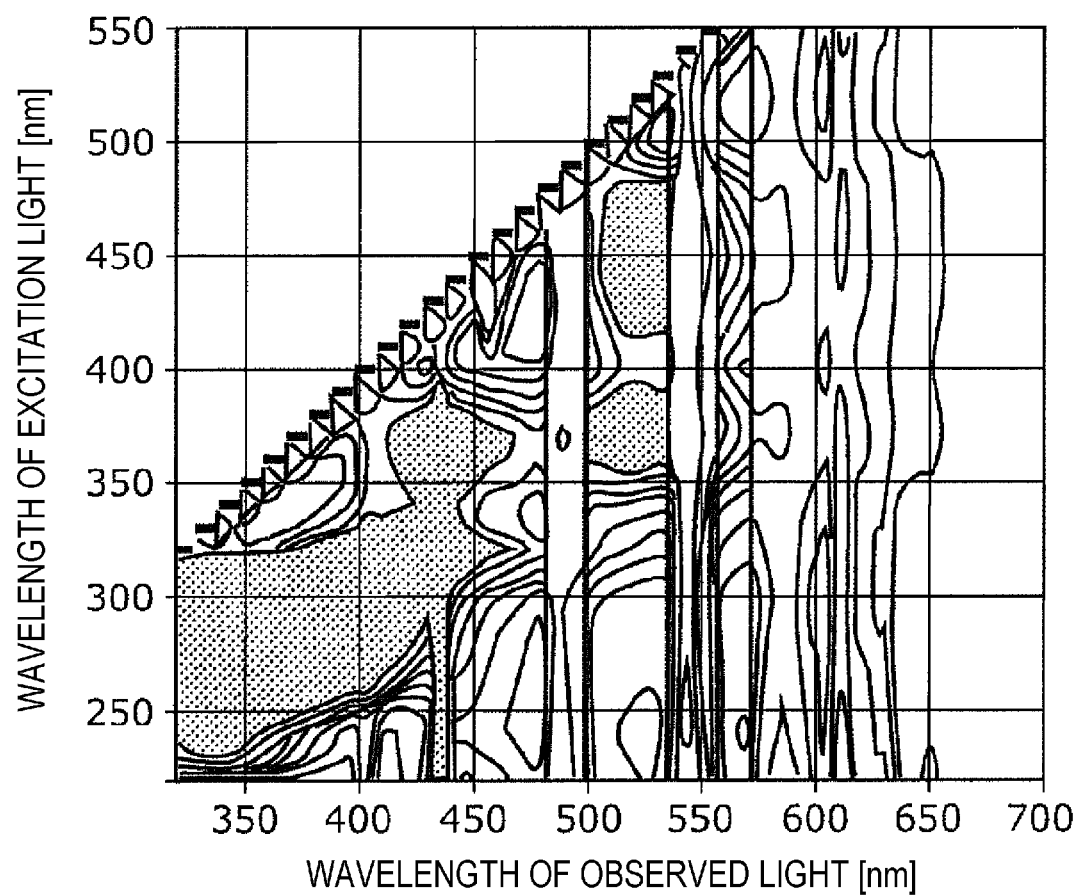
FIG. 8 is a diagram showing an example of a fluorescence fingerprint based on a signal, generated by a signal processing circuit of the light observation apparatus according to Embodiment 1, from which signal components equivalent to the ambient light have been attenuated.

FIG. 8 is a diagram showing an example of a fluorescence fingerprint based on a signal, generated by the signal processing circuit 40 of the light observation apparatus 10 according to Embodiment 1, from which signal components equivalent to the ambient light 12 have been attenuated. FIG. 9 is a diagram showing a signal, generated by the signal processing circuit 40 of the light observation apparatus 10 according to Embodiment 1, from which signal components equivalent to the ambient light 12 have been attenuated. FIGS. 8 and 9 correspond to FIGS. 6 and 7, respectively.

Figure 9:
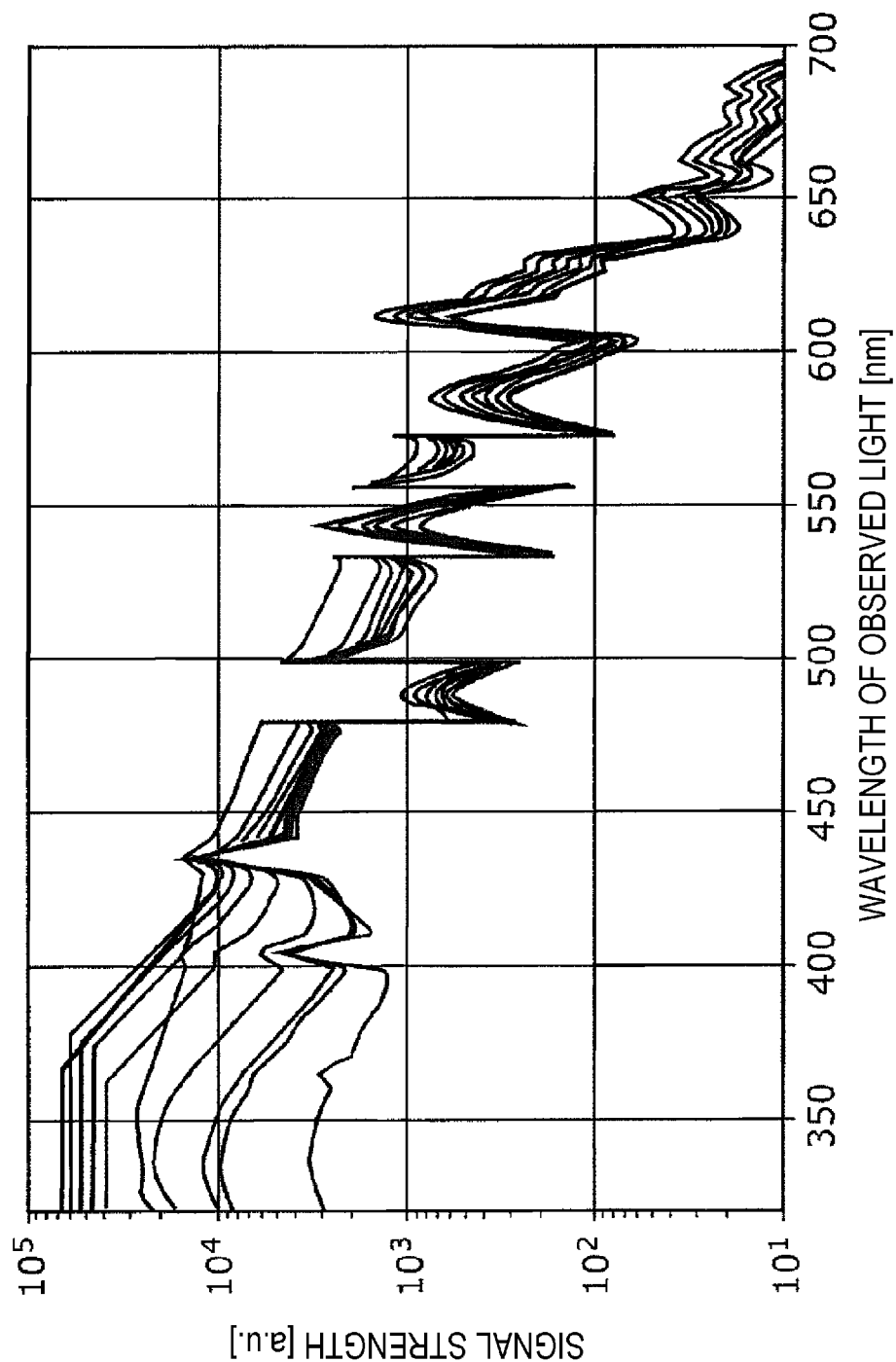
FIG. 9 is a diagram showing a signal, generated by the signal processing circuit of the light observation apparatus according to Embodiment 1, from which signal components equivalent to the ambient light have been attenuated.

The signals shown in FIGS. 8 and 9 are signals obtained by eliminating, from the first output signal, the signal components equivalent to the ambient light 12, i.e. signal components having no excitation wavelength dependency. As can be seen from a comparison among FIGS. 4, 6, and 8, the fluorescence fingerprint generated on the basis of the signal from which the signal components equivalent to the ambient light 12 have been attenuated exhibits a more clearly identifiable dependence relationship between excitation wavelength and observation wavelength than the fluorescence fingerprint shown in FIG. 6, as is the case with the fluorescence fingerprint shown in FIG. 4. Accordingly, by utilizing such a fluorescence fingerprint, a component of the physical object 11 can be identified. The fluorescence fingerprint shown in FIG. 8 is generated by the evaluator 42.

In Embodiment 1, with continued reference to FIG. 4, the identifier 43 of the signal processing circuit 40 identifies a component of the physical object 11 on the basis of the signal from which the signal component equivalent to the ambient light 12 has been attenuated (S16). Specifically, the identifier 43 identifies a combination of an excitation wavelength and an observation wavelength with a high signal strength on the basis of a fluorescence fingerprint that is generated from the signal from which the signal component equivalent to the ambient light 12 has been attenuated, and identifies a substance corresponding to the combination with reference to the table of association.

As noted above, the light observation apparatus 10 according to Embodiment 1 attenuates a signal component equivalent to the ambient light 12 from a first output signal based on light from a physical object 11 irradiated with the ambient light 12. A fluorescence fingerprint generated on the basis of the signal from which the signal component equivalent to the ambient light 12 has been attenuated exhibits the excitation wavelength dependency of fluorescence, as is the case with a fluorescence fingerprint generated on the basis of light from a physical object 11 not irradiated with the ambient light 12. Accordingly, a component of the physical object 11 can be identified with high accuracy on the basis of a fluorescence fingerprint that is generated on the basis of the signal from which the signal component equivalent to the ambient light 12 has been attenuated.

In this way, the light observation apparatus 10 according to Embodiment 1 can identify a component of the physical object 11 even in a case where the physical object 11 is being irradiated with the ambient light 12. Accordingly, Embodiment 1 makes it possible to provide a highly-versatile light observation apparatus 10.

Embodiment 2

Next, Embodiment 2 is described.

A light observation apparatus according to Embodiment 2 differs from the light observation apparatus 10 according to Embodiment 1 in terms of how a first output signal is attenuated. Specifically, in Embodiment 2, a second output signal representing the reception intensity for each observation wavelength of second light that falls on a photodetector in a case where excitation light 13 is not being emitted is attenuated from the first output signal as a signal component equivalent to ambient light 12.

2-1. Configuration

Figure 10:
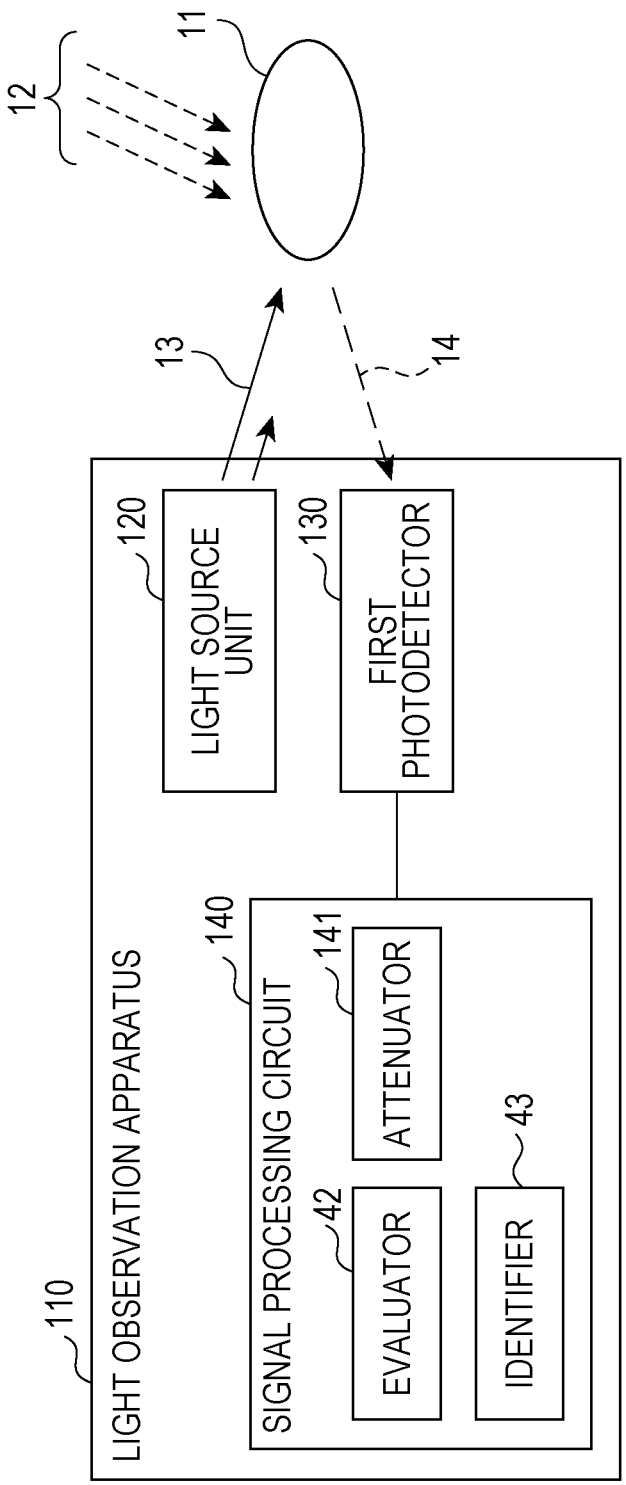
FIG. 10 is a block diagram showing a configuration of a light observation apparatus according to Embodiment 2.

First, a configuration of a light observation apparatus according to Embodiment 2 is described with reference to FIG. 10. FIG. 10 is a block diagram showing a configuration of a light observation apparatus 110 according to Embodiment 2.

As shown in FIG. 10, the light observation apparatus 110 includes a light source unit 120, a first photodetector 130, and a signal processing circuit 140. The light source unit 120, the first photodetector 130, and the signal processing circuit 140 are equivalent to the light source unit 20, the first photodetector 30, and the signal processing circuit 40 according to Embodiment 1, respectively. The following gives a description with a focus on differences from Embodiment 1 and omits or simplifies a description of common features.

The light source unit 120 can switch between the turning on and turning off of the irradiation of the physical object 11 with the excitation light 13. Specifically, the light source unit 120 switches between the turning on and turning off of emission of the excitation light 13 on the basis of an external input such as a user operation and a result of reception of light by the first photodetector 130. The light source unit 120 is connected, for example, to a controller that switches between the turning on and turning off of emission of the excitation light 13.

For example, the light source unit 120 emits the excitation light 13 upon receiving from a user an operation to start a fluorescence observation and, after a first signal has been outputted from the first photodetector 130, stops emitting the excitation light 13. Alternatively, upon receiving from a user an operation to start a fluorescence observation, the light source unit 120 may start emitting the excitation light 13 after a second output signal has been outputted from the first photodetector 130.

The first photodetector 130 receives second light that falls on the first photodetector 130 in a case where the physical object 11 is not being irradiated with the excitation light 13, and outputs a second output signal representing the reception intensity of the second light for each observation wavelength. The second light does not contain fluorescence that is produced from the physical object 11 due to the irradiation with the excitation light 13.

The signal processing circuit 140 includes an attenuator 141 instead of the attenuator 41. The attenuator 141 attenuates the second output signal from the first output signal as the signal component equivalent to the ambient light 12. Specifically, the attenuator 141 subtracts the signal strength of the second output signal from the signal strength of the first output signal for each observation wavelength and thereby generates a signal from which the signal component equivalent to the ambient light 12 has been attenuated.

2-2. Operation

Figure 11:
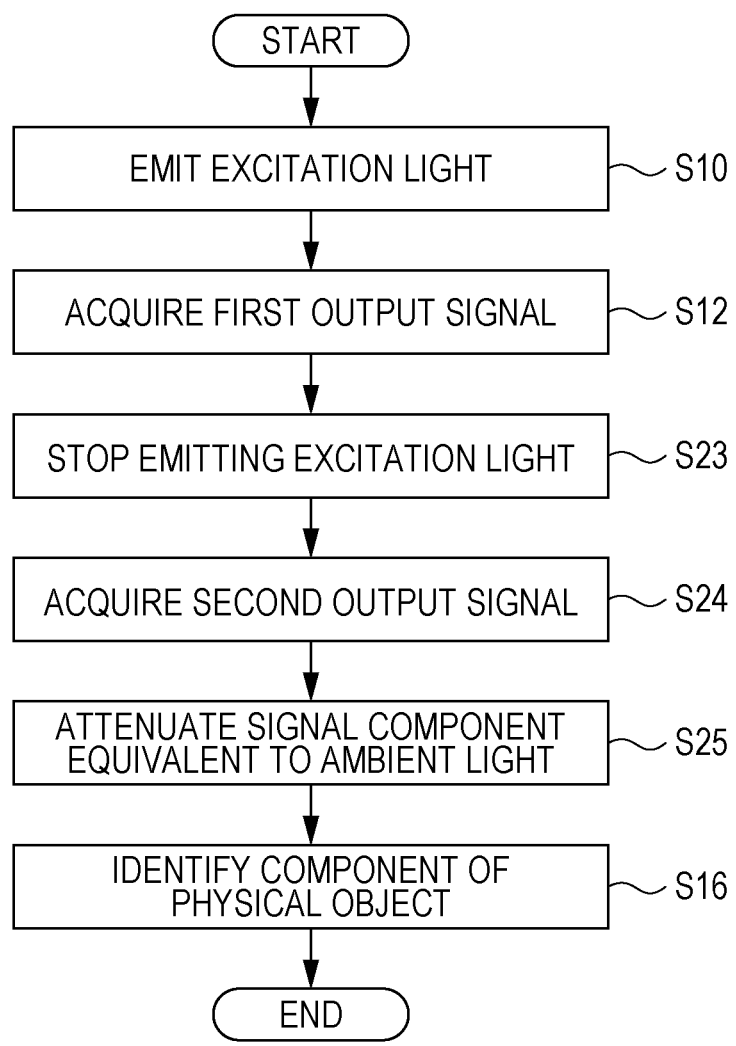
FIG. 11 is a flow chart showing operation of the light observation apparatus according to Embodiment 2.

Next, operation of the light observation apparatus 110 according to Embodiment 2 is described with reference to FIG. 11. FIG. 11 is a flow chart showing the operation of the light observation apparatus 110 according to Embodiment 2.

As shown in FIG. 11, the emission of the excitation light 13 (S10) and the acquisition of a first output signal (S12) are the same as those of the process shown in FIG. 4. Specifically, the signal processing circuit 40 acquires the first output signal shown in FIGS. 6 and 7.

Next, the light source unit 120 stops emitting the excitation light 13 (S23). Specifically, the light source unit 120 stops emitting the excitation light 13 after the first output signal has been outputted from the first photodetector 130.

The first output signal is stored, for example, in a storage (not illustrated) or the like provided in the signal processing circuit 140.

Next, the first photodetector 130 receives light (i.e. second light) from the physical object 11 and outputs a second output signal representing the reception intensity of the light for each observation wavelength (S24).

Figure 12:
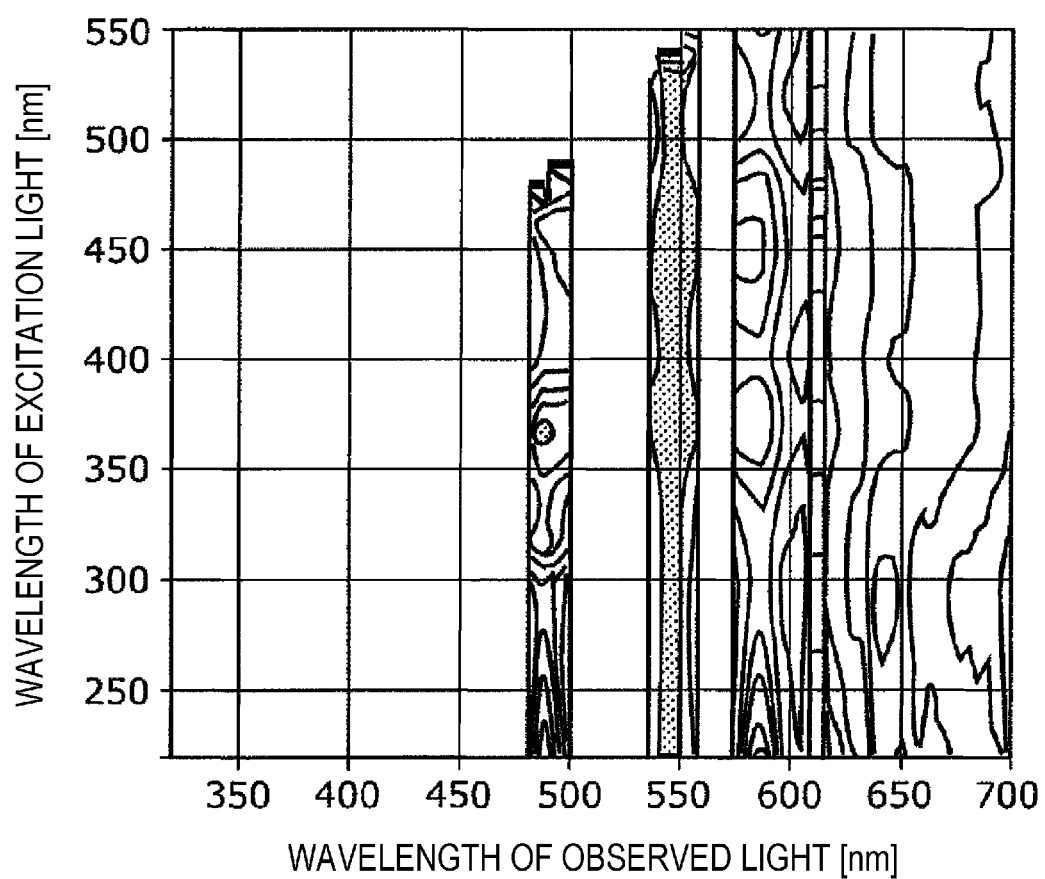
FIG. 12 is a diagram showing an example of a fluorescence fingerprint based on light received by a first photodetector of the light observation apparatus according to Embodiment 2 while a physical object is not being irradiated with excitation light.

FIG. 12 is a diagram showing an example of a fluorescence fingerprint based on light received by the first photodetector 130 of the light observation apparatus 110 according to Embodiment 2 while the physical object 11 is not being irradiated with the excitation light 13. It should be noted that FIG. 12 has been prepared not by actual measurement but by simulation. For this reason, FIG. 12 is technically different from the spectrum of the ambient light 12 as shown in FIG. 5.

As shown in FIG. 12, longitudinal stripes with high signal intensities appear in a wavelength band equivalent to the peak wavelengths of the ambient light 12. The fluorescence fingerprint shown in FIG. 12 does not contain a component that depends on excitation wavelength, as the physical object 11 is not being irradiated with the excitation light 13.

Next, the attenuator 141 attenuates the second output signal from the first output signal as the signal component equivalent to the ambient light 12 (S25). Specifically, since the fluorescence fingerprint shown in FIG. 12 is eliminated from the fluorescence fingerprint shown in FIG. 6, a signal equivalent to the fluorescence fingerprint shown in FIG. 8 is generated.

Finally, the identifier 43 identifies a component of the physical object 11 on the basis of the signal from which the signal component equivalent to the ambient light 12 has been attenuated (S16). The specific process is similar to that of Embodiment 1.

As noted above, according to the light observation apparatus 110 according to Embodiment 1, a signal from which a signal component equivalent to the ambient light 12 has been attenuated is generated by simply subtracting a second output signal from a first output signal without the need to identify a signal component having no excitation wavelength dependency. This makes it possible to reduce throughput pertaining to signal processing.

Further, since light is received in a case where fluorescence is hardly produced from the physical object 11 without irradiation with the excitation light 13, most of the light thus received turns into a component attributed to the ambient light 12. Accordingly, the light observation apparatus 110 can acquire the reception intensity of the ambient light 12 with high accuracy and can therefore also enhance the accuracy of analysis of the physical object 11 with enhanced accuracy of fluorescence observation.

Embodiment 3

Next, Embodiment 3 is described.

A light observation apparatus according to Embodiment 3 differs from the light observation apparatus 110 according to Embodiment 2 in terms of how a second output signal is generated. Specifically, in Embodiment 3, the light observation apparatus includes a second photodetector that generates and outputs a second output signal.

Figure 13:
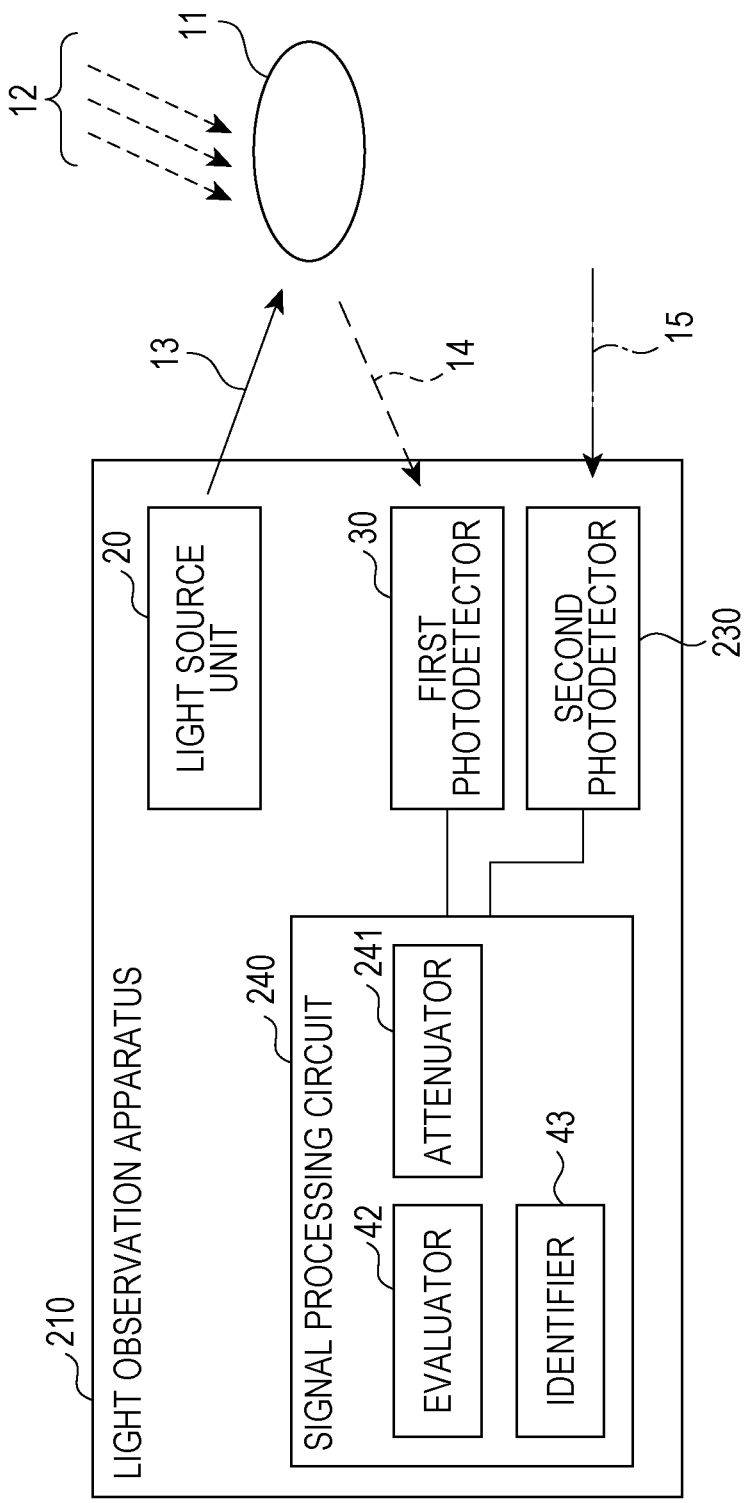
FIG. 13 is a block diagram showing a configuration of a light observation apparatus according to Embodiment 3.

FIG. 13 is a block diagram showing a configuration of a light observation apparatus 210 according to Embodiment 3.

As shown in FIG. 13, the light observation apparatus 210 differs from the light observation apparatus 110 according to Embodiment 2 in that it includes a light source unit 20 and a signal processing circuit 240 instead of the light source unit 120 and the signal processing circuit 140 and newly includes a second photodetector 230. The following gives a description with a focus on differences from Embodiment 2 and omits or simplifies a description of common features.

The second photodetector 230 is provided in a position that does not overlap an optical path of fluorescence produced by the physical object 11. For example, the second photodetector 230 is disposed so that a photodetection surface of the first photodetector 30 and a photodetection surface of the second photodetector 230 face in different directions from each other. Specifically, for example, the photodetection surface of the first photodetector 30 is disposed on a first surface of a housing of the light observation apparatus 210, and the photodetection surface of the second photodetector 230 is disposed on a second surface that faces the first surface. By thus providing the second photodetector 230, the fluorescence produced by the physical object 11 is prevented from falling on the second photodetector 230.

The second photodetector 230 receives second light 15 equivalent to the ambient light 12 and outputs a second output signal representing the reception intensity of the second light 15. In Embodiment 3, the second photodetector 230 receives the second light 15 and outputs a second output signal representing the reception intensity of the second light 15 for each observation wavelength. Specifically, the second photodetector 230 receives, as the second light 15, a component of the ambient light 12 reflected by an area different from an area being irradiated with irradiation light emitted from the light source unit 20 and a component of the ambient light 12 that falls directly on the second photodetector 230. The second photodetector 230 is similar in configuration to the first photodetector 30 shown in FIG. 2.

It should be noted that the first photodetector 30 and the second photodetector 230 may be different portions of a single photodetection device. For example, the light observation apparatus 210 may include an image sensor including the first photodetector 30 and the second photodetector 230.

Figure 14:
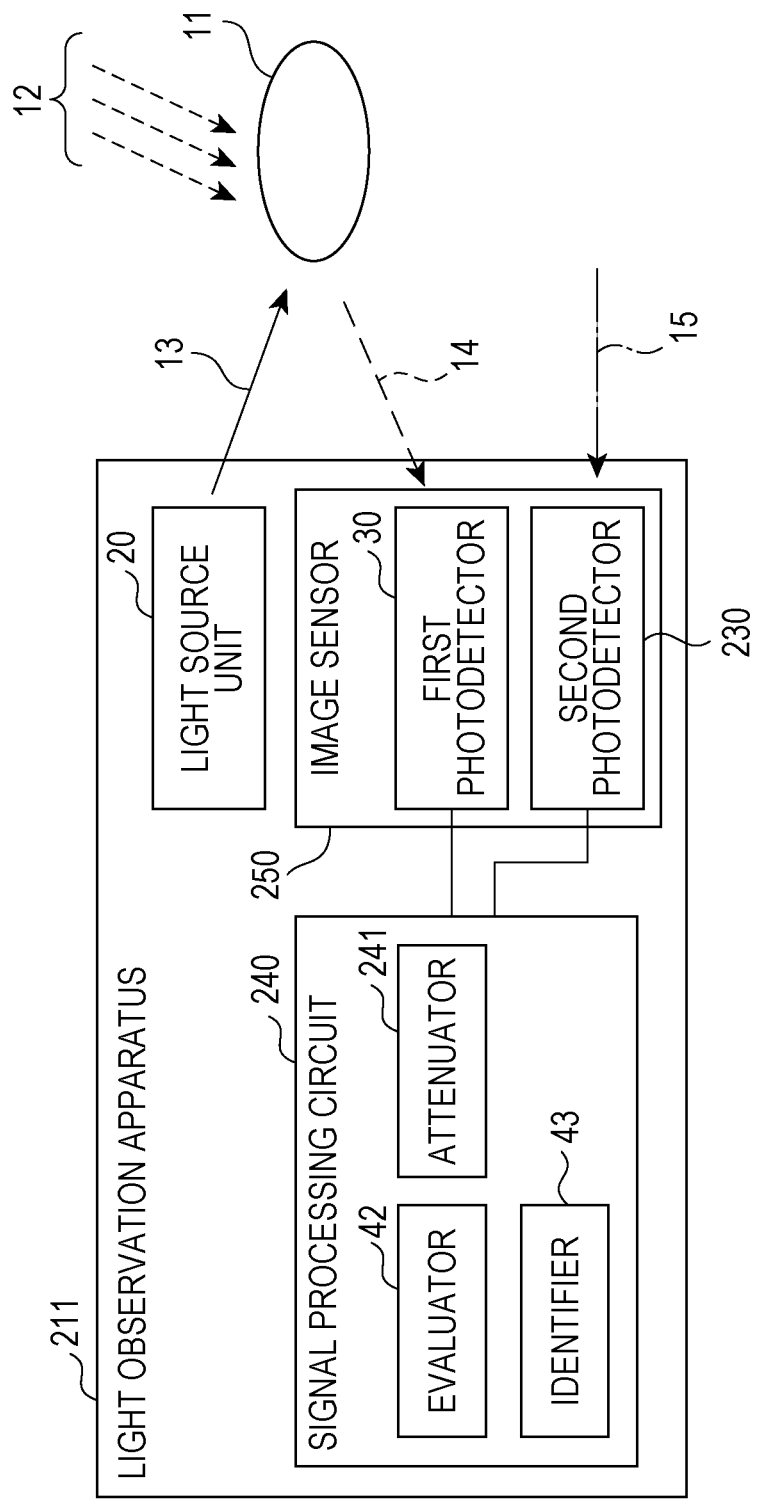
FIG. 14 is a block diagram showing a configuration of a light observation apparatus according to a modification of Embodiment 3.

For example, a light observation apparatus 211 shown in FIG. 14 includes an image sensor 250 including a first photodetector 30 and a second photodetector 230. It should be noted that FIG. 14 is a block diagram showing a configuration of a light observation apparatus 211 according to a modification of Embodiment 3.

The image sensor 250 is an image sensor that has a photodetection area where a plurality of pixels are arranged. In this case, the first photodetector 30 and the second photodetector 230 are different areas from each other in the photodetection area. Specifically, for example, in the photodetection area of the image sensor 250, the spacing between a first area equivalent to the first photodetector 30 and a second area equivalent to the second photodetector 230 is larger than the spot size of the fluorescence produced by the physical object 11.

The second light 15 hardly contains the excitation light 13 or fluorescence excited by the excitation light 13 but contains the ambient light 12. Accordingly, the second output signal is considered to be equivalent to the second output signal of Embodiment 2.

The signal processing circuit 240 includes an attenuator 241 instead of the attenuator 141. The attenuator 241 attenuates a signal component equivalent to the ambient light 12 from the first output signal through a calculation of the first output signal and the second output signal. Specifically, the attenuator 241 attenuates the second output signal from the first output signal as the signal component equivalent to the ambient light 12. More specifically, the attenuator 241 subtracts the signal strength of the second output signal from the signal strength of the first output signal for each observation wavelength and thereby generates a signal from which the signal component equivalent to the ambient light 12 has been attenuated.

As noted above, the light observation apparatus 210 according to Embodiment 3 includes the second photodetector 230; therefore, while the first photodetector 30 is receiving light containing fluorescence produced from the physical object 11, the second photodetector 230 can receive light containing no fluorescence produced by the excitation light 13. For example, since the second photodetector 230 can be utilized exclusively to receive the ambient light 12, the reception intensity of the ambient light 12 can be acquired with high accuracy. This makes it possible to also enhance the accuracy of analysis of component of the physical object 11 with enhanced accuracy of fluorescence observation.

Embodiment 4

Next, Embodiment 4 is described.

A light observation apparatus according to Embodiment 4 differs from the light observation apparatuses according to Embodiments 1 to 3 in terms of a physical object to be sensed. Further, the light observation apparatus according to Embodiment 4 does not receive fluorescence produced by the physical object but receives reflected light (or specifically, backscattered light) from the physical object.

4-1. Configuration

Figure 15:
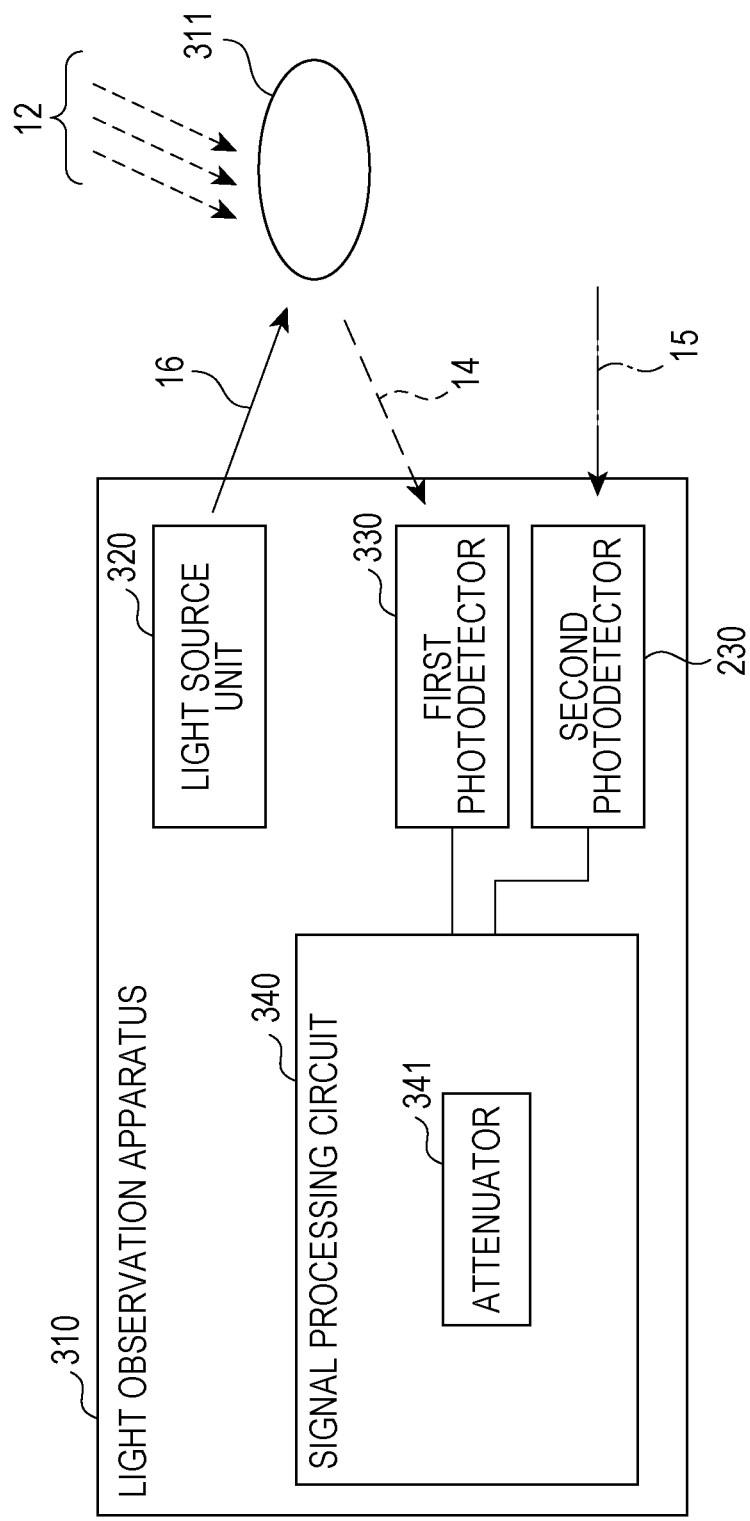
FIG. 15 is a block diagram showing a configuration of a light observation apparatus according to Embodiment 4.
Figure 16:
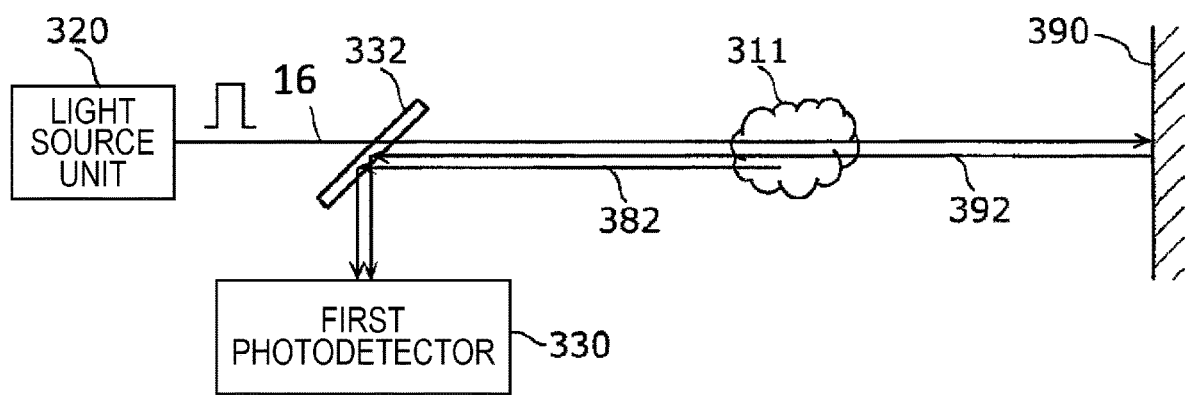
FIG. 16 is a diagram schematically showing a principle of the light observation apparatus according to Embodiment 4.

FIG. 15 is a block diagram showing a configuration of a light observation apparatus 310 according to Embodiment 4. FIG. 16 is a diagram schematically showing a principle of the light observation apparatus 310 according to Embodiment 4.

As shown in FIG. 15, the light observation apparatus 310 differs from the light observation apparatus 210 according to Embodiment 3 in that it includes a light source unit 320, a first photodetector 330, and a signal processing circuit 340 instead of the light source unit 20, the first photodetector 30, and the signal processing circuit 240. The following gives a description with a focus on differences from Embodiment 3 and omits or simplifies a description of common features.

In Embodiment 4, a physical object 311 is a fine particle, included in fine particles (so-called aerosol) floating in a space, that produces no fluorescence. An example of the physical object 311 is particulate matter such as PM 2.5 or PM 10, yellow sand, dirt, or the like. The physical object 311 is for example an inorganic substance containing no organic substance but may be an organic substance such as pollen. As schematically shown in FIG. 16, the physical object 311 is locally suspended in a 50-centimeter cubic range.

The light source unit 320 is an example of a light source that irradiates the physical object 311 with irradiation light 16. The irradiation light 16 emitted by the light source unit 320 may be light of a wavelength selected from a wide wavelength band, as there is no need to excite the physical object 311. For example, the light source unit 320 includes a laser diode or an LED with a wavelength falling within a range of 300 nm or longer to 1400 nm or shorter. The light source unit 320 has a wavelength of near infrared light or infrared light of, for example, 780 nm or longer. For example, the laser diode or the LED emits pulsed light.

As in the case of Embodiment 1, the light source unit 320 may include, for example, a light-emitting lens 24. The light-emitting lens 24 is for example a collimator lens. The light emitted from the laser diode or the LED is converted into parallel light by the light-emitting lens 24 and outputted as the irradiation light 16.

Upon irradiation of the physical object 311 with the irradiation light 16 from the light source unit 320, the first photodetector 330 receives first light 14 containing reflected light that is a reflection of at least part of the irradiation light 16 by the physical object 311 and the ambient light 12, and outputs a first output signal representing the reception intensity of the first light 14. In Embodiment 4, specifically, the reflected light is backscattered light produced by Mie scattering from the physical object 311. A usable example of the first photodetector 330 is a photodiode or a photomultiple tube (PMT).

In Embodiment 4, the wavelength of the reflected light is substantially the same as the wavelength of the irradiation light 16, as the irradiation light 16 is not wavelength-converted by the physical object 311. For this reason, an observation wavelength by the first photodetector 330 is the same as the wavelength of the irradiation light 16 emitted by the light source unit 320.

For example, as shown in FIG. 16, the first photodetector 330 is provided in a position 90 degrees lateral to a direction of emission of the irradiation light 16 from the light source unit 320. Provided on a path of the irradiation light 16 is a semitransparent mirror 332. The semitransparent mirror 332 transmits the irradiation light 16 emitted from the light source unit 320 and reflects the reflected light from the physical object 311. The reflected light thus reflected is received by the first photodetector 330.

As in the case of Embodiment 3, the second photodetector 230 receives second light 15 equivalent to the ambient light 12 and outputs a second output signal representing the reception intensity of the second light 15. For example, the second light receiving unit 230 is provided so that there is no overlap in photodetection range between the first photodetector 330 and the second photodetector 230.

The signal processing circuit 340 does not include the evaluator 42 or the identifier 43 but includes an attenuator 341. The attenuator 341 attenuates a signal component equivalent to the ambient light 12 from the first output signal through a calculation of the first output signal and the second output signal. For example, the attenuator 341 attenuates the second output signal from the first output signal as the signal component equivalent to the ambient light 12.

4-2. Operation

Next, operation of the light observation apparatus 310 according to Embodiment 4 is described with reference to FIGS. 16 to 19.

In Embodiment 4, first, the light source unit 320 emits the irradiation light 16. As shown in FIG. 16, in the presence of the physical object 311, at least part of the irradiation light 16 emitted from the light source unit 320 is reflected by the physical object 311. At this point in time, light reflected backward, i.e. backscattered light 382, is reflected by the semitransparent mirror 332 and received by the first photodetector 330.

Further, the remaining part of the irradiation light 16 emitted from the light source unit 320 is reflected by a wall surface 390 or the like. The reflected light 392 too is reflected by the first photodetector 330, as is the case with the backscattered light 382.

Figure 17:
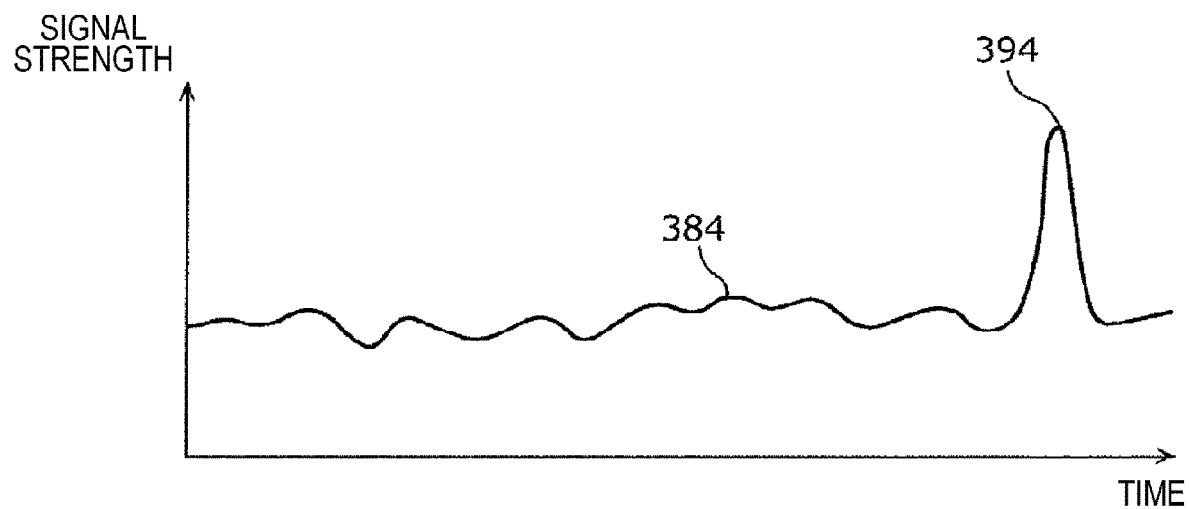
FIG. 17 is a diagram showing time changes of a signal that is outputted from a first photodetector of the light observation apparatus according to Embodiment 4.

FIG. 17 is a diagram showing time changes of a signal that is outputted from the first photodetector 330 of the light observation apparatus 310 according to Embodiment 4. In FIG. 17, the horizontal axis represents the time elapsed since the point of time at which the irradiation light 16, which is pulsed light, was emitted, and the vertical axis represents the signal strength of a first output signal that is outputted from the first photodetector 330. The same applies to FIGS. 18 and 19, which will be described later.

As shown in FIG. 17, a peak 384 equivalent to the backscattered light 382 appears after the irradiation light 16 has been emitted. The point in time at which the peak 384 appears is equivalent to the distance from the light source unit 320 and the first photodetector 330 to the physical object 311. The size of the peak 384 is equivalent to the size or concentration of particles of the physical object 311.

Figure 18:
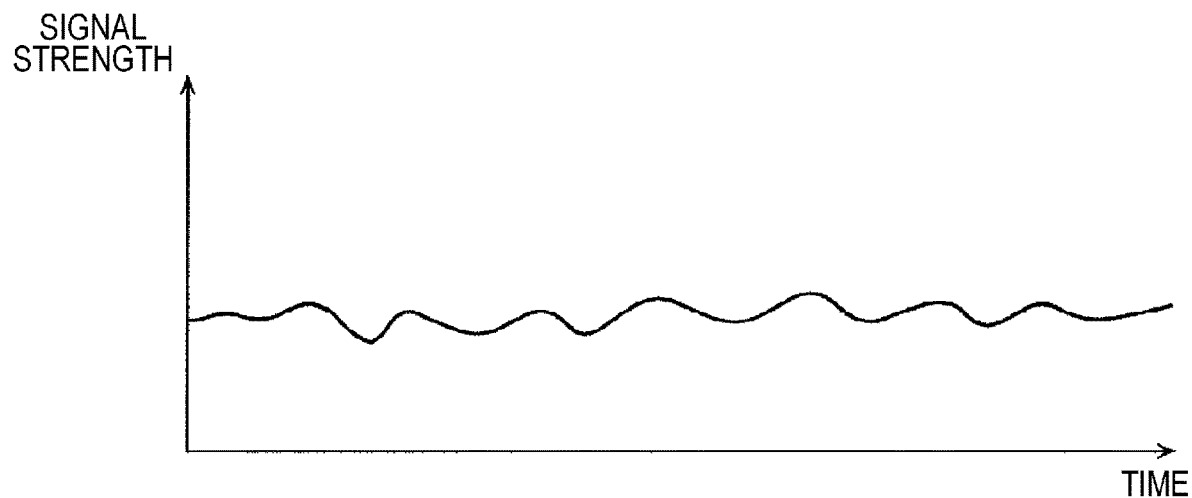
FIG. 18 is a diagram showing time changes of a signal that is outputted from a second photodetector of the light observation apparatus according to Embodiment 4.

Since the ambient light 12 falls on the first photodetector 330, too, the first output signal also contains a signal component equivalent to the ambient light 12 as shown in FIG. 18. As shown in FIG. 18, in a case where there are fluctuations in intensity of the ambient light 12, it becomes difficult to detect the peak 384, as the peak 384 is caught up in the fluctuations in intensity of the ambient light 12 as shown in FIG. 17.

Note here that FIG. 18 is a diagram showing time changes of a signal that is outputted from the second photodetector 230 of the light observation apparatus 310 according to Embodiment 4. The second photodetector 230 does not receive the irradiation light 16, the backscattered light 382, or the reflected light 392 but receives the ambient light 12 surrounding the light observation apparatus 310. For this reason, a second output signal that is outputted from the second photodetector 230 is equivalent to the signal component equivalent to the ambient light 12.

In Embodiment 4, the attenuator 341 of the signal processing circuit 340 attenuates the signal component equivalent to the ambient light 12 from the first output signal shown in FIG. 17. Specifically, the attenuator 341 attenuates the second output signal shown in FIG. 18 from the first output signal shown in FIG. 17. As a result, a signal shown in FIG. 19 is generated.

Figure 19:
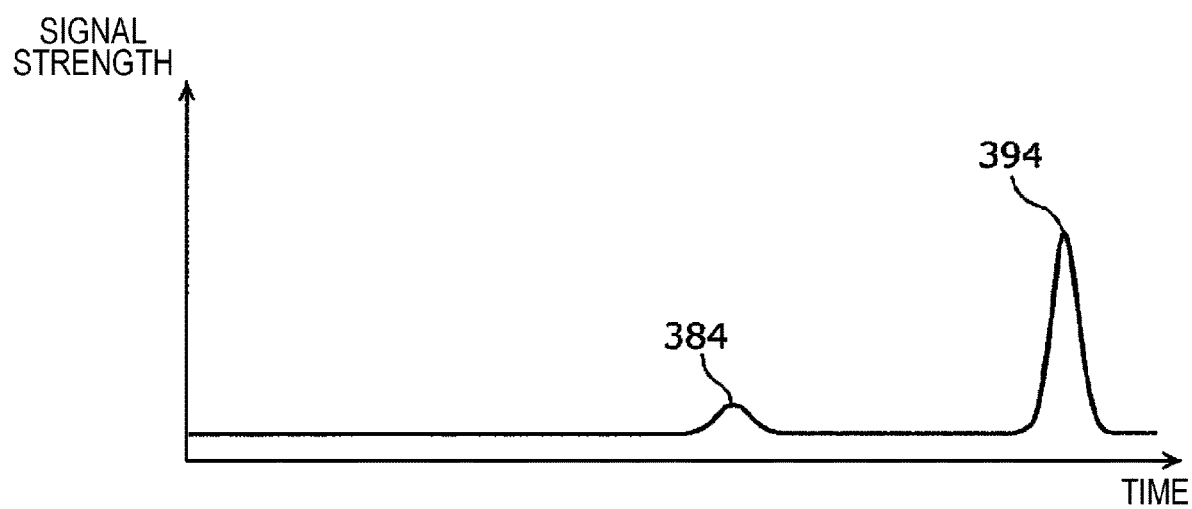
FIG. 19 is a diagram showing a signal generated by a signal processing circuit of the light observation apparatus according to Embodiment 4 and obtained by attenuating a signal component equivalent to ambient light from a first output signal.

FIG. 19 is a diagram showing a signal generated by the signal processing circuit 340 of the light observation apparatus 310 according to Embodiment 4 and obtained by attenuating the signal component equivalent to the ambient light 12 from the first output signal. As shown in FIG. 19, since the signal component equivalent to the ambient light 12 has been attenuated, the peak 384, which is equivalent to the backscattered light 382, which is light reflected from the physical object 311, can be detected with high accuracy. The signal processing circuit 340 identifies the type and location of the physical object 311, for example, on the basis of the time and size of the peak 384.

After the peak 384 has appeared, a peak 394 equivalent to the reflected light 392 reflected by the wall surface 390 appears. The point in time at which the peak 394 appears is equivalent to the distance from the light source unit 320 and the first photodetector 330 to the wall surface 390. The size of the peak 394 is larger than the size of the peak 384.

In a case where no physical object 311 is present, the peak 384 does not appear, but the peak 394 appears. This shows that no physical object 311 is present between the light source unit 320 and the wall surface 390.

In Embodiment 4, the light source unit 320 may emit the excitation light 13 as irradiation light. In this case, in a case where the physical object 311 is an organic substance, fluorescence is received by the first photodetector 330. In a case where the physical object 311 is an inorganic substance, which does not emit fluorescence, backscattered light produced by Mie scattering is received by the first photodetector 330. Since the fluorescence and the backscattered light have different wavelengths, separation of the wavelengths by the first photodetector 330 makes it possible to determine whether which wavelength component of light has been received. This makes it possible to determine whether the physical object 311 is an organic substance or an inorganic substance.

OTHER EMBODIMENTS

In the foregoing, light observation apparatuses according to one or more aspects have been described with reference to embodiments; however, the present disclosure is not intended to be limited to these embodiments. Applications to the present embodiments of various types of modification conceived of by persons skilled in the art and embodiments constructed by combining constituent elements of different embodiments are encompassed in the scope of the present disclosure, provided such applications and embodiments do not depart from the spirit of the present disclosure.

For example, each of the photoreceptors 31 may be an image sensor including a matrix arrangement of a plurality of pixels serving as photoelectric conversion elements. This makes it possible to make two-dimensional fluorescence observations and therefore makes it possible to simultaneously conduct componential analyses of a plurality of physical objects 11 that are present in a predetermined area. Specifically, since fluorescence fingerprints can be obtained for each separate pixel of the image sensor, componential analyses of the physical objects 11 can be conducted for each separate pixel.

Further, for example, the light observation apparatus 10 does not need to include the light source unit 20. For example, another excitation light source may irradiate the physical object 11 with the excitation light 13, and the light observation apparatus 10 may receive fluorescence that is produced by the excitation light 13 with which the physical object 11 has been irradiated. Alternatively, the light observation apparatus 10 may utilize, as the excitation light 13, a wavelength component contained in the ambient light 12.

Further, for example, the signal processing circuit 40 of the light observation apparatus 10 does not need to include the identifier 43. For example, the signal processing circuit 40 may include, instead of the identifier 43, an output terminal, a communication interface, or the like that outputs fluorescence fingerprint data. The signal processing circuit 40 may output the fluorescence fingerprint data to the server apparatus.

Further, for example, although the foregoing embodiments have illustrated a case where the physical object 11 is a human's vomit, pollen, house dust, or the like, this is not intended to impose any limitation. The physical object 11 is not limited to any particular object, provided that it contains a substance that produces fluorescence upon irradiation with the excitation light 13. Further, as illustrated in Embodiment 4, the physical object 11 may be an object that produces no fluorescence.

Further, for example, the present disclosure may be realized as a light observation method including, as steps, processes that are performed by the signal processing circuit of a light observation apparatus according to each embodiment.

For example, in a light observation method, first, the signal processing circuit acquires a first output signal representing the intensity for each separate one of a plurality of observation wavelengths of first light 14 containing fluorescence that is produced from a physical object 11 upon irradiation of the physical object 11 with excitation light 13 having an excitation wavelength selected from among excitation wavelengths differing from each other (step S12 of FIG. 4). Next, the signal processing circuit attenuates a signal component equivalent to ambient light 12 from the first output signal thus acquired and evaluates, for each combination of an excitation wavelength and an observation wavelength, the signal strength of the first output signal from which the signal component equivalent to the ambient light 12 has been attenuated (step S14 of FIG. 4). Further, the signal processing circuit may identify a component of the physical object 11 on the basis of the signal from which the signal component equivalent to the ambient light 12 has been attenuated (step S16 of FIG. 4).

Further, in another light observation method, first, the signal processing circuit acquires a first output signal representing the reception intensity of first light 14 containing at least one selected from the group consisting of reflected light returning from a physical object 11 and fluorescence produced by the physical object 11 upon irradiation of the physical object 11 with irradiation light from a light source and ambient light 12 (step S12 of FIG. 11). Next, the signal processing circuit acquires a second output signal representing the reception intensity of second light 15 containing the ambient light 12 (step S24 of FIG. 11). It should be noted that the acquisition of the first output signal and the acquisition of the second output signal may be performed at the same time, or either of them may precede the other. Next, the signal processing circuit attenuates a signal component equivalent to the ambient light 12 from the first output signal through a calculation of the first output signal and the second output signal (step S25 of FIG. 11).

It should be noted that the present disclosure cannot only be realized as a light observation method but can also be realized as a program for causing a computer to execute steps of the light observation method and a recording medium, such as a DVD (digital versatile disc), storing the program. The aforementioned steps are achieved by the computer reading and executing the program stored on the recording medium. The program may be stored in advance on the recording medium or may be supplied to a recording medium via a wide area communication network including the Internet.

Further, in each of the embodiments described above, each of the constituent elements of the signal processing circuit of the light observation apparatus may be configured by dedicated hardware or may be realized by executing a software program suited to that constituent element. Each of the constituent elements may be realized by a program executor such as a CPU (central processing unit) or a processor reading and executing a software program stored on a recording medium such as a hard disk or a semiconductor memory.

At this point in time, the processor is not limited in type, provided that it can fulfill a function by executing the program. For example, the processor is constituted by one or more electronic circuits including a semiconductor integrated circuit such as an IC (integrated circuit) or an LSI (large-scale integrated circuit). The plurality of electronic circuits may be integrated into a single chip or may be provided on a plurality of chips. The plurality of chips may be consolidated into a single device or may be decentrally provided in a plurality of devices.

It should be noted that general or specific embodiments may be implemented as a system, an apparatus, an integrated circuit, a computer program, a computer-readable recording medium, or any selective combination thereof.

Further, each of the embodiments described above is subject to various changes, substitutions, additions, omissions, and the like in the scope of the claims or the scope of equivalents thereof.

What is claimed is:

1. A light observation apparatus comprising:
   a first photodetector that, upon irradiation of at least part of a physical object with irradiation light, receives first light containing ambient light and at least one selected from the group consisting of reflected light returning from the at least part and fluorescence produced from the at least part, and that outputs a first output signal representing a reception intensity of the first light;
   a second photodetector, provided in a position that does not overlap an optical path of the at least one selected from the group consisting of the reflected light and the fluorescence, that receives second light containing the ambient light and outputs a second output signal representing a reception intensity of the second light; and
   a signal processing circuit, wherein
   the signal processing circuit attenuates a first signal component corresponding to the ambient light from the first output signal based on the first output signal and the second output signal.

2. The light observation apparatus according to claim 1, wherein
   the irradiation light has an excitation wavelength selected from among a plurality of excitation wavelengths differing from each other, and
   the first light contains the fluorescence.

3. The light observation apparatus according to claim 2, wherein the signal processing circuit further identifies a component contained in the physical object based on a signal strength of the first output signal from which the first signal component has been attenuated.

4. The light observation apparatus according to claim 3, wherein
   the first photodetector receives the first light at a plurality of observation wavelengths differing from each other, and
   the signal processing circuit identifies the component contained in the physical object by evaluating, for each combination of the plurality of excitation wavelengths and the plurality of observation wavelengths, the signal strength of the first output signal from which the first signal component has been attenuated.

5. The light observation apparatus according to claim 1, wherein the first light contains the reflected light.

6. The light observation apparatus according to claim 1, wherein
   each of the first and second photodetectors includes pixels, and
   the first and second photodetectors constitute an image sensor.

7. The light observation apparatus according to claim 1, further comprising a light source that irradiates the physical object with the irradiation light.

8. The light observation apparatus according to claim 1, wherein the ambient light is interior illumination light.

9. The light observation apparatus according to claim 1, wherein the physical object is a human's vomit.

10. The light observation apparatus according to claim 1, wherein the physical object is a fine particle floating in a space.

11. A light observation apparatus comprising:
    a first photodetector that, upon irradiation of a physical object with irradiation light having an excitation wavelength selected from among a plurality of excitation wavelengths differing from each other, receives first light containing fluorescence produced from the physical object and ambient light and that outputs a first output signal representing a reception intensity of the first light; and a signal processing circuit, wherein the signal processing circuit attenuates a first signal component corresponding to the ambient light from the first output signal, the first signal component being a signal component, contained in the first output signal, whose correlation between a signal strength of the signal component and the excitation wavelength is smaller than a reference value.

12. The light observation apparatus according to claim 11, wherein the first photodetector receives the first light at a plurality of observation wavelengths differing from each other, the signal processing circuit calculates, for each of the plurality of observation wavelengths, a difference absolute value between a signal strength of the first output signal corresponding to a first excitation wavelength selected from among the plurality of excitation wavelengths and a signal strength of the first output signal corresponding to a second excitation wavelength selected from among the plurality of excitation wavelengths, and in a case where the difference absolute value is not greater than a threshold, the signal processing circuit attenuates the first signal component from the first output signal, the first signal component being a signal component, contained in the first output signal, that is at an observation wavelength corresponding to the difference absolute value.

13. The light observation apparatus according to claim 11, wherein the signal processing circuit further identifies a component contained in the physical object based on a signal strength of the first output signal from which the first signal component has been attenuated.

14. The light observation apparatus according to claim 13, wherein the first photodetector receives the first light at a plurality of observation wavelengths differing from each other, and the signal processing circuit identifies the component contained in the physical object by evaluating, for each combination of the plurality of excitation wavelengths and the plurality of observation wavelengths, the signal strength of the first output signal from which the first signal component has been attenuated.

15. The light observation apparatus according to claim 11, further comprising a light source that irradiates the physical object with the irradiation light.

16. The light observation apparatus according to claim 11, wherein the ambient light is interior illumination light.

17. The light observation apparatus according to claim 11, wherein the physical object is a human's vomit.

18. The light observation apparatus according to claim 11, wherein the physical object is a fine particle floating in a space.

19. A non-transitory computer-readable recording medium storing a program that, when executed by a computer, causes the computer to perform operations comprising:

causing a first photodetector to, upon irradiation of at least part of a physical object with irradiation light, receive first light containing ambient light and at least one selected from the group consisting of reflected light returning from the at least part and fluorescence produced from the at least part, and to output a first output signal representing a reception intensity of the first light;

causing a second photodetector to receive second light containing the ambient light and output a second output signal representing a reception intensity of the second light; and causing a signal processing circuit to attenuate a first signal component corresponding to the ambient light from the first output signal based on the first output signal and the second output signal.

20. A non-transitory computer-readable recording medium storing a program that, when executed by a computer, causes the computer to perform operations comprising:

causing a first photodetector to, upon irradiation of a physical object with irradiation light having an excitation wavelength selected from among a plurality of excitation wavelengths differing from each other, receive first light containing fluorescence produced from the physical object and ambient light and to output a first output signal representing a reception intensity of the first light; and causing a signal processing circuit to attenuate a first signal component corresponding to the ambient light from the first output signal, the first signal component being a signal component, contained in the first output signal, whose correlation between a signal strength of the signal component and the excitation wavelength is smaller than a reference value.

* * * * *